United States Patent
Chen et al.

(10) Patent No.: US 9,740,811 B2
(45) Date of Patent: *Aug. 22, 2017

(54) VIRTUAL HIERARCHICAL LAYER PATTERNING

(71) Applicant: Synopsys, Inc., Mountain View, CA (US)

(72) Inventors: Jun Chen, Cary, NC (US); James Lewis Nance, Raleigh, NC (US); Gary B Nifong, Durham, NC (US)

(73) Assignee: SYNOPSYS, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/673,064

(22) Filed: Mar. 30, 2015

(65) Prior Publication Data

US 2015/0339431 A1 Nov. 26, 2015

Related U.S. Application Data

(60) Provisional application No. 62/002,808, filed on May 24, 2014, provisional application No. 62/006,069, filed on May 31, 2014, provisional application No. 62/006,657, filed on Jun. 2, 2014, provisional application No. 62/006,083, filed on May 31, 2014, provisional application No. 62/006,607, filed on Jun.
(Continued)

(51) Int. Cl.
*G06F 17/50* (2006.01)
(52) U.S. Cl.
CPC .......... *G06F 17/5072* (2013.01); *G06F 17/50* (2013.01); *G06F 17/5009* (2013.01); *G06F 17/5081* (2013.01); *G06F 2217/12* (2013.01); *Y02P 90/265* (2015.11)

(58) Field of Classification Search
CPC ............ G06F 17/5081; G06F 2217/12; G06F 17/5072; G06F 17/5009
USPC ....................... 716/112, 52, 54, 55
See application file for complete search history.

(56) References Cited

U.S. PATENT DOCUMENTS

| 5,281,558 | A | 1/1994 | Bamji et al. |
| 5,309,371 | A | 5/1994 | Shikata et al. |

(Continued)

OTHER PUBLICATIONS

"Virtual Layer Generation During Failure Analysis", U.S. Appl. No. 14/604,694, filed Jan. 24, 2015, Synopsys Inc.
(Continued)

*Primary Examiner* — Phallaka Kik
(74) *Attorney, Agent, or Firm* — Alston & Bird LLP

(57) ABSTRACT

Identifying the interactions of a selected cell across a hierarchical diagram of an integrated circuit and mapping the ways in which the cell can interact with other structures in the hierarchy reduces the computational load for design rule checking (DRC) and design rules for manufacturing (DRM). To this end, a cell and multiple instances of the cell are identified within hierarchical design levels of the chip. The interactions between the cell and other cells within the hierarchy are subtracted from the cell boundary, and the results of the subtracting are merged in the cell boundary. By subtracting the results of the merging, identical interactions are identified across the multiple instances of the cell. The results of the subtracting are used to generate a virtual hierarchical layer identical (VHLi) which aids in the simulation and verification of the chip.

30 Claims, 18 Drawing Sheets

Related U.S. Application Data 2, 2014, provisional application No. 62/006,092, filed on May 31, 2014.

(56) References Cited

U.S. PATENT DOCUMENTS

| | | | |
|---|---|---|---|
| 5,493,510 A | 2/1996 | Shikata | |
| 5,528,508 A | 6/1996 | Russell et al. | |
| 5,559,718 A | 9/1996 | Baisuck et al. | |
| 6,009,250 A | 12/1999 | Ho et al. | |
| 6,009,251 A | 12/1999 | Ho et al. | |
| 6,011,911 A | 1/2000 | Ho et al. | |
| 6,035,113 A | 3/2000 | Gerber et al. | |
| 6,047,116 A | 4/2000 | Murakami et al. | |
| 6,275,971 B1 | 8/2001 | Levy | |
| 6,289,412 B1 | 9/2001 | Yuan et al. | |
| 6,363,516 B1* | 3/2002 | Cano | G06F 17/5036 716/115 |
| 6,543,039 B1* | 4/2003 | Watanabe | G06F 17/5068 716/124 |
| 6,629,304 B1 | 9/2003 | Gasanov et al. | |
| 6,730,463 B2* | 5/2004 | Heissmeier | G03F 1/30 378/35 |
| 6,845,494 B2 | 1/2005 | Burks et al. | |
| 6,886,148 B2 | 4/2005 | Solomon | |
| 6,969,837 B2 | 11/2005 | Ye | |
| 7,103,863 B2 | 9/2006 | Riepe et al. | |
| 7,146,583 B1 | 12/2006 | Sun et al. | |
| 7,149,989 B2 | 12/2006 | Lakshmanan | |
| 7,155,440 B1 | 12/2006 | Kronmiller et al. | |
| 7,415,694 B2 | 8/2008 | Mayhew | |
| 7,418,693 B1 | 8/2008 | Gennari et al. | |
| 7,461,359 B1 | 12/2008 | Nequist | |
| 7,847,937 B1 | 12/2010 | Bevis | |
| 7,873,204 B2 | 1/2011 | Wihl et al. | |
| 7,873,585 B2 | 1/2011 | Izikson | |
| 7,984,395 B2 | 7/2011 | Cork | |
| 8,019,561 B1* | 9/2011 | Sahrling | G06F 17/5081 702/59 |
| 8,453,091 B1 | 5/2013 | Rao et al. | |
| 8,539,416 B1* | 9/2013 | Rossman | G06F 17/5081 716/118 |
| 8,799,833 B2 | 8/2014 | Wann et al. | |
| 9,405,879 B2 | 8/2016 | Wang et al. | |
| 9,454,635 B2 | 9/2016 | Oberai | |
| 2002/0046392 A1* | 4/2002 | Ludwig | G03F 1/30 716/52 |
| 2003/0163795 A1* | 8/2003 | Morgan | G06F 17/5068 716/114 |
| 2003/0229882 A1* | 12/2003 | Ludwig | G03F 1/30 716/52 |
| 2005/0076316 A1 | 4/2005 | Pierrat et al. | |
| 2005/0183053 A1 | 8/2005 | Ishizuka | |
| 2005/0235245 A1 | 10/2005 | Kotani et al. | |
| 2008/0046849 A1 | 2/2008 | Choi | |
| 2008/0127016 A1* | 5/2008 | Ishikawa | G06F 17/5072 716/122 |
| 2008/0155485 A1* | 6/2008 | Lin | G06F 17/5072 716/123 |
| 2008/0244493 A1 | 10/2008 | Finkler | |
| 2009/0089720 A1 | 4/2009 | Nequist | |
| 2009/0210845 A1* | 8/2009 | Malgioglio | G06F 17/505 716/119 |
| 2009/0216450 A1 | 8/2009 | Sakamoto et al. | |
| 2009/0287440 A1 | 11/2009 | Kulkarni | |
| 2009/0310870 A1 | 12/2009 | Monkowski | |
| 2010/0238433 A1 | 9/2010 | Lange et al. | |
| 2010/0251202 A1 | 9/2010 | Pierrat | |
| 2014/0215422 A1* | 7/2014 | Juneja | G06F 17/5081 716/112 |
| 2015/0089457 A1* | 3/2015 | Agarwal | G03F 7/70466 716/52 |
| 2015/0339426 A1 | 11/2015 | Nifong et al. | |
| 2015/0339430 A1 | 11/2015 | Nifong et al. | |
| 2015/0339432 A1* | 11/2015 | Nance | G06F 17/5072 716/106 |
| 2015/0339433 A1 | 11/2015 | Nifong et al. | |
| 2015/0339434 A1 | 11/2015 | Nifong et al. | |

OTHER PUBLICATIONS

U.S. Appl. No. 14/604,694, Non-Final Office Action dated Nov. 19, 2015.
U.S. Appl. No. 14/604,694, Notice of Allowance dated Jun. 2, 2016.
U.S. Appl. No. 14/634,695, Final Office Action dated Dec. 14, 2016.
U.S. Appl. No. 14/634,695, Non-Final Office Action dated Jul. 1, 2016.
U.S. Appl. No. 14/673,709, Final Office Action dated Sep. 23, 2016.
U.S. Appl. No. 14/673,709, Non-Final Office Action dated Jun. 2, 2016.
U.S. Appl. No. 14/673,709, Notice of Allowance dated Nov. 8, 2016.
U.S. Appl. No. 14/713,716, Final Office Action dated Jan. 9, 2017.
U.S. Appl. No. 14/713,716, Non-Final Office Action dated Aug. 11, 2016.
U.S. Appl. No. 14/719,996, Non-Final Office Action dated Aug. 26, 2016.
U.S. Appl. No. 14/719,996, Notice of Allowance dated Nov. 16, 2016.
U.S. Appl. No. 14/713,488.
U.S. Appl. No. 14/673,709, Notice of Allowance dated Mar. 2, 2017.
U.S. Appl. No. 14/713,488, Non-Final Office Action dated Mar. 2, 2017.
U.S. Appl. No. 14/719,996, Notice of Allowance dated Mar. 15, 2017.

* cited by examiner

VIRTUAL HIERARCHICAL LAYER PATTERNING

RELATED APPLICATIONS

This application claims the benefit of U.S. provisional patent applications "Virtual Hierarchical Layer Usage" Ser. No. 62/002,808, filed May 24, 2014, "Virtual Hierarchical Layer Patterning" Ser. No. 62/006,069, filed May 31, 2014, "Virtual Cell Model Geometry Compression" Ser. No. 62/006,657, filed Jun. 2, 2014, "Negative Plane Usage with a Virtual Hierarchical Layer" Ser. No. 62/006,083, filed May 31, 2014, "Virtual Cell Model Usage" Ser. No. 62/006,607, filed Jun. 2, 2014, and "Virtual Hierarchical Layer Propagation" Ser. No. 62/006,092, filed May 31, 2014. Each of the foregoing applications are hereby incorporated by reference in their entirety.

FIELD OF ART

This application relates generally to semiconductor circuit design and more particularly to physical verification of semiconductor designs using Design Rule Checking (DRC).

BACKGROUND

Modern integrated circuits (ICs) are commonly very complex constructions that utilize many millions of devices across a chip. Because of this complexity, many of the steps in designing an IC are automated to allow the human designer to concentrate on the high level functionality of the IC. One such step that is usually highly automated is the physical verification process for the IC. The physical verification process for an IC is a design step taken by semiconductor manufacturers before commencing the fabrication of the IC. Semiconductor foundries define a set of design rules for manufacturing (DRM) for IC designers to follow in order to ensure successful manufacture and high yield of a design during the fabrication process. The DRM are defined as a set of geometric relationships between manufacturing layers, layers which in turn are used to create an IC. A physical design layout can include hundreds of layers used during the fabrication process to create transistors and electrical interconnect in the IC. The semiconductor process has grown in complexity and a physical design layout must adhere to thousands of design rules before a design can be successfully fabricated. Use of a design rule checking (DRC) physical verification tool is an industry standard process for implementing the semiconductor's DRM.

The DRM can define many different parameters, such as width, spacing, angle, enclosure, density and electrical connectivity rules for design layers, which in turn are translated into a DRC runset. A DRC runset is defined as set of DRC operations that verify the required DRM rules. A DRC tool provides a set of operations, or commands, which a designer uses to build a sequence of DRC commands to satisfy each DRM rule. DRM rules commonly result in a DRC runset with 20,000 or more DRC commands for technology nodes smaller than 28 nanometers (nm). Modern DRC physical verification tools have a large suite of geometric and electrical commands to effectively implement the complex DRM rules. Many of the geometric and electrical commands result in the implementation of a unique algorithm that is not shared between individual commands, thus resulting in a very complex DRC tool with many algorithms.

Large ICs are typically built using a hierarchical method that begins with the creation of small child cells which are combined into larger parent cells, which are then successively used to build larger and larger cells to create an IC hierarchical design. Physical verification tools take advantage of the hierarchy in a design to efficiently process extremely large designs. Various forms of flattening processes are an alternative to hierarchical processing, but the flattening processes can result in very large increases in processing time and are often not feasible for design verification.

SUMMARY

A virtual hierarchical layer identical (VHLi) is used in a fast, memory efficient hierarchical verification algorithm that uses a hierarchical geometric shape which is referred to as a virtual hierarchical layer (VHL). The VHLi includes geometric shapes that have the property of conveying identical layer patterns which encompass the global hierarchical information for all instances of a design cell in an integrated circuit.

A computer-implemented method for design analysis is disclosed comprising: identifying a cell and multiple instances of the cell within a semiconductor design that includes a plurality of hierarchical design levels; determining, for each cell instance, interactions between the cell and other structures in the plurality of hierarchical design levels; subtracting, for each cell instance, from a boundary of the cell, the interactions that were determined; merging results of the subtracting into the boundary of the cell; and subtracting results of the merging from the boundary of the cell to define identical interactions across the multiple instances. The method can include using data from the subtracting results of the merging to generate a virtual hierarchical layer identical (VHLi) layer. In embodiments, the method can include performing a logical operation with the VHLi layer and a cell.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Configuration Overview

Figure 1:
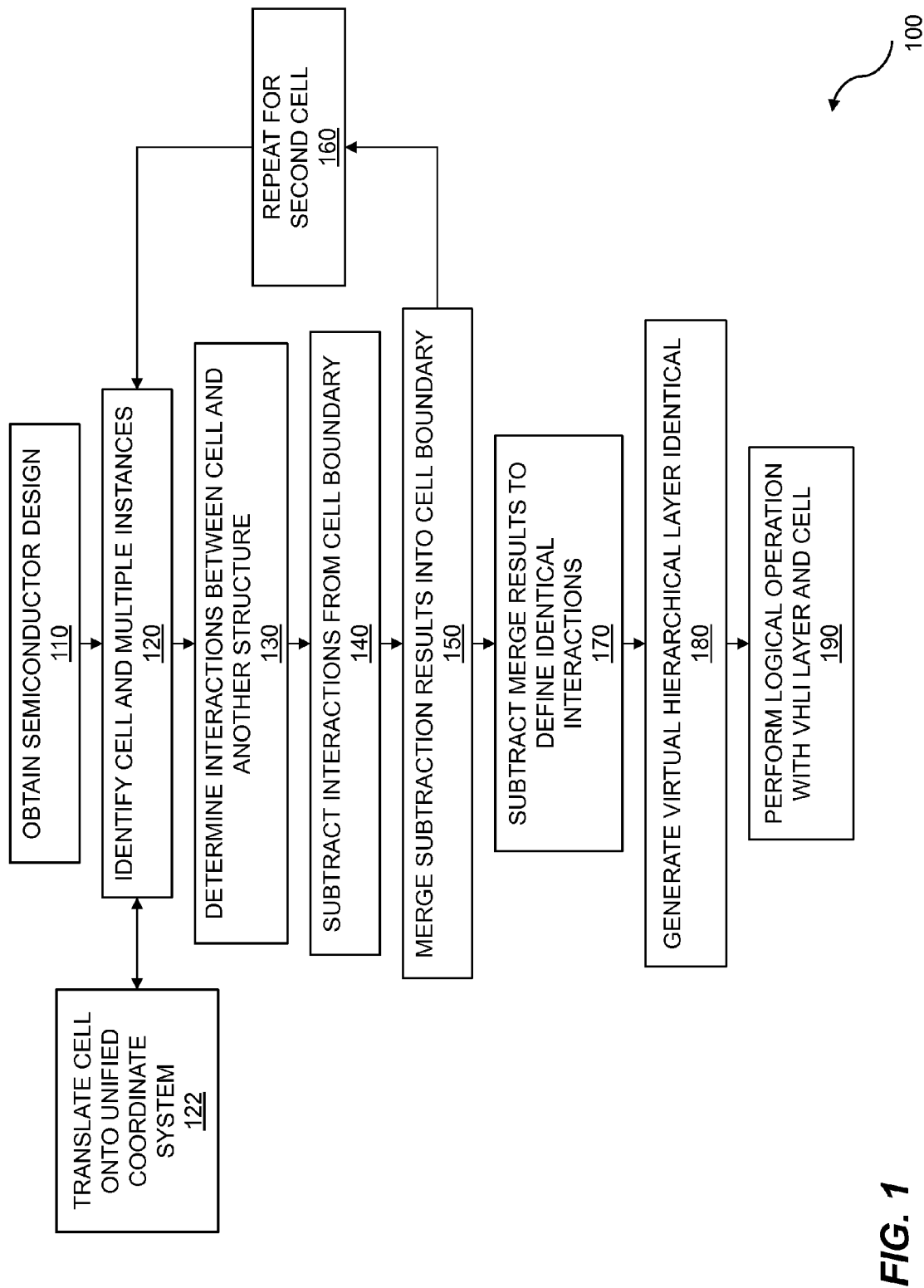
FIG. 1 is a flow diagram for virtual hierarchical layer patterning.

Methods, systems, and computer program products are described herein that relate to electronic design automation (EDA) and physical verification of semiconductor designs using a design rule checking (DRC) process as defined by semiconductor foundries. More specifically, building a particular type of optimized virtual hierarchical layer (VHL) called a virtual hierarchical layer identical (VHLi) is described. A virtual hierarchical layer identical (VHLi) includes geometric shapes that convey identical layer patterns which encompass the global hierarchical information for all instances of a particular integrated circuit (IC) design cell.

Hierarchical physical verification of an integrated circuit (IC) is a complex process due to the multitude of hierarchical design styles that are created by IC design companies and other tools within the IC industry. Differences in design styles often result in extremely complex designs many levels deep, which contain billions of cells and polygons overlapping each other throughout the hierarchy. In many verification methods, a hierarchical verification tool collapses the inefficient cell hierarchies and merges duplicate polygons to build a new hierarchy for the tool's individual command algorithms. Once the hierarchical tool builds its new hierarchy, then the layers stored at various levels of the newly-built hierarchy are processed in relation to each other based on the definition of the design rules and the unique geometric algorithms needed to implement the same rules. As noted above, each semiconductor foundry or design firm can stipulate its own set of rules, called design rules for manufacturing (DRM), which ensure the production of a functional chip according to specifications. To this end, each set of DRM contains numerous conditions which must be verified and validated for an IC to be determined functional. For example, a DRM rule for a certain IC can require verification to be performed by executing a sequence of commands (algorithms) in a design rule checking (DRC) runset, with each algorithm in the sequence cycling through proximal layers in the hierarchy to produce a hierarchical result which then feeds subsequent commands until the DRM rule is determined to be satisfied. An algorithm can have many optimizations which have been designed to avoid flattening the algorithm's result (output layer). Without these algorithmic optimizations, hierarchical data flattening causes the DRC algorithms to lose flexibility in processing by forcing cell data into ever larger chunks and creating extra processing time for the current algorithm and subsequent algorithms in the DRM rule.

Some hierarchical DRC methods are dependent on having the majority or entirety of an IC's design layers loaded in memory before beginning the hierarchical algorithmic cycles that perform geometric operations on design data throughout the hierarchy. As would be expected, loading an entire design layer into memory and providing the preloaded layer to the algorithm can reduce algorithm complexity. The implementation of such a hierarchical algorithm involves cycling design layers through the hierarchy searching for algorithmic interactions of geometric shapes. The hierarchical cycling is typically performed as either single-layer cycling, dual-layer cycling, or for some complex algorithms, N-layer cycling. However, as the layer count increases for a hierarchical algorithm, so do the memory requirements of loading the layers into memory, which becomes problematic for larger and larger designs. In fact, given the exploding size of modern IC designs, loading an entire design layer often requires an infeasible amount of memory.

In response to the massive memory requirement of loading an entire layer, several hierarchical DRC methods load only partial layers into memory, which reduces memory requirements for the hierarchical algorithms but increases algorithmic complexity and data loading time. For example, data loading time increases if all the layer data of a cell is not able to be kept in memory and the data must be reloaded every time one of the cell's multiple instantiations interacts with a hierarchical geometric shape being examined. Additionally, reloading the interacting data many times becomes a significant CPU performance issue. For example, if Cell A is instantiated multiple times in a hierarchical design, and Cell A's data has not been pre-loaded into memory, then every time a hierarchical layer's polygon is cycled through the hierarchy and interacts with an instantiation of Cell A, Cell A's data would have to be reloaded dynamically from the disk, resulting in significant CPU I/O. As the alternative method of loading the entire design layer into machine memory has already been mentioned as infeasible given the increasing complexity and decreasing node size of modern semiconductor designs, virtual hierarchical layers are herein presented as an alternative. Virtual hierarchical layers eliminate dynamic cell reloading, nullify the need to load an entire IC design layer into memory, and provide a mechanism for cell-level, bottom-up algorithms for processing hierarchical layers without data flattening.

Current hierarchical DRC methodologies typically exhibit a performance tradeoff between memory consumption and dynamic data load time. The Virtual Hierarchical Layer (VHL) described in US Patent Application "Virtual Hierarchical Layer Usage" Ser. No. 14/634,695 filed Feb. 27, 2015, which is hereby incorporated by reference in its entirety, describes a method to reduce both memory and data load time by providing a bottom up, cell-level processing technique.

Embodiments of the VHL create a hierarchical geometric layer for the purpose of performing an efficient hierarchical DRC process for verification of an IC design before the design proceeds to a fabrication stage in one of many possible semiconductor manufacturing processes. In one embodiment, the hierarchical geometric layers in an IC design are used to generate the VHL for a current cell from a combination of rectangles, trapezoids, and other shapes that reside in the hierarchy above the cell, as well as from geometric shapes in non-descendant sibling cells that interact with the cell.

The hierarchical information is collected by finding any geometric shape not contained by the cell (i.e., not in the current cell or in any of its descendants) that is overlapping any hierarchical placement of the current cell. The obtained hierarchical information is then used to compute the VHL. To gather the necessary geometric information regarding overlaps, all cells in the hierarchy are processed against the current cell's boundary. A two-step procedure is used for the hierarchical information propagation in some embodiments. First, it is determined whether or not the cell being processed can overlap with the current cell. Then, if there is a potential overlap, the geometric shapes in the cell are checked, and the shapes overlapping the current cell's boundary are collected. This two-step procedure falls into one of four cases, according to a hierarchical cell's relationship with the current cell:

1) If the cell being processed is the direct ancestor of the current cell, the cell can contain geometric shapes that overlap with one or more placements of the current cell. Therefore, the shapes of the direct ancestor cell being processed which overlap with the current cell are collected for the VHL generation.

2) If the cell being processed is a direct sibling of the current cell, one or more of the placements of the cell being processed can overlap with one or more placements of the current cell. In this case, the sibling cell being processed can still contain geometric shapes that overlap with the current cell, so the shapes of the direct sibling cell being processed are collected for the VHL generation. Some embodiments check to see if the cell boundaries overlap before processing the geometric shapes of the sibling cells.

3) If the cell being processed is an indirect sibling of the current cell, the indirect sibling cell, by definition, shares one or more common ancestor cells with the current cell in the hierarchy. As with a direct sibling cell, common ancestor cells can be used to determine whether the cell being processed has placements that overlap with any of the current cell's placements. If any overlapping exists, the geometric shapes in the indirect sibling cell that overlap with the current cell are collected for the VHL generation.

4) If the cell being processed is the direct descendant of the current cell, none of its data is collected for the VHL generation.

Once the hierarchical information has been collected, the VHL is calculated for the cell. Because the previously described procedures collect geometric shapes from other cells of the hierarchy which can have various placement orientations with respect to current cell, each collected shape is transformed to reflect its geometric position relative to the placement of the current cell when the overlap occurs. The transformation process can require several different coordinate transformations. For example, when the geometric shape is from a direct sibling cell, both the coordinates of the shape and the current cell can be transformed to the parent cell's coordinates. After the coordinate transformation, the part of the shape that falls into the boundary of the cell can be stored as a shape in the VHL. In this way, related shapes can be merged and form the VHL, which in turn provides a snapshot of the hierarchical overlapping for the cell.

The embodiment described above generates VHL information for each cell only within its cell boundary. For example, if a geometric shape only abuts one placement of a cell, the shape will not show up in the VHL for the cell. Since it is important for some DRC algorithms to know the information surrounding the cell, another embodiment of the shape generation generates VHL shapes for an additional area surrounding the cell boundary. This second embodiment collects shapes in the same way as the previous embodiment, but instead of the original cell boundary, an oversized cell boundary (a virtual boundary) is used for the VHL calculation.

In such embodiments, the VHL is computed by collecting the hierarchical geometric shapes overlapping a cell's virtual boundary. In this case the VHL includes the accumulation of the data comprising the overlapping shapes that are pushed into a cell's virtual boundary and then merged into complex geometric shapes. The virtual boundary includes a cell's merged layer boundaries plus an additional cell margin referred to as an ambit. The ambit area is a ring-shaped area extended outside the original cell boundary created by extending the cell boundary by a small value known as the ambit value. Creating an ambit is also referred to as oversizing the cell. Hierarchical data that overlaps the oversized current cell (cell plus ambit area) is pushed into the virtual boundary, with the overlapping data pushed from parent cells and sibling cells into the current cell. Hierarchical data that does not overlap the current cell boundary but does overlap the ambit portion is also pushed into the virtual boundary. As a result, the geometric shapes overlapping the ambit extension area will be collected, and, along with the shapes overlapping the cell's actual boundary, will be computed into the complete VHL for the cell. In this way, hierarchical information on potentially interacting shapes for a cell is stored in the VHL, even if the shapes are slightly outside of the cell's boundaries.

Some embodiments also include an apparatus that executes VHL hierarchical algorithms as independent cell-level processes. A VHL allows the cell-level processes to accomplish additional cell-level data processing in the cell without flattening data out of the cell. The cell-level data processing for each VHL algorithm eliminates the need for reloading data and limits memory consumption, since the entire layer hierarchy is not loaded into memory. In an additional embodiment, a single cell is processed, start to finish, by an instance of the VHL cell-level process, which allows for significant parallelization and multi-threading across all cells in an IC Design.

A DRC algorithm that uses a VHL takes in the pre-generated VHL shapes together with the input data layers and performs cell-level geometric operations. The creation of the VHL is a separate process which occurs before the DRC algorithms begin. Existing DRC tools acquire hierarchical information as the DRC algorithms are cycling on the hierarchical geometric shapes, thus the collected information in the VHL can be fed in to existing DRC tools. A VHL is independent from any particular DRC algorithm; one VHL is not limited to use by a specific DRC algorithm. Thus, if two DRC algorithms are performed on the same input data layers, the two can share the same VHL. The sharing and reuse of the VHL also provides efficiency and flexibility for the implementation of DRC algorithms.

A virtual hierarchical layer identical (VHLi), which is a specific type of VHL, includes information about the hierarchical geometric layer related to a cell for the purpose of improving VHL algorithms which are used to produce an efficient hierarchical DRC process to aid in correct semiconductor manufacturing. Embodiments of the current disclosure relate to generating and using the VHLi to improve the VHL algorithms operating on a hierarchical IC design layer. VHLi shapes defined in a cell are used to promote efficient cell-level processing and help prevent geometric shapes from flattening out of the cell and moving up in the design hierarchy. VHLi achieves the reduction in upward movement and flattening by providing the VHL algorithms with additional information about the hierarchical data that resides outside placements of an individual cell under examination in the IC design. Embodiments can improve both run time efficiency and the quality of the results of the physical verification tool.

When an instance of a cell is placed in a design hierarchy, the placement can interact with other data outside of the cell. Such interactions are defined as hierarchical interactions. There are generally two types of hierarchical interactions. First, when the VHL boundary of a placement of a cell overlaps or abuts its parent cell's cell-level polygon data, the interaction can be termed a parent-child hierarchical interaction. Second, when the VHL boundary of a placement of a cell overlaps or abuts the polygon data of another placement of a cell in the same parent hierarchy, the interaction can be termed a sibling-to-sibling interaction. The overlapping placements can have their own hierarchy; therefore the hierarchical interactions can have several levels of depth. A virtual hierarchical layer identical (VHLi) is created to show the hierarchical interactions that are common to the various instantiations of a cell. In some embodiments, a virtual hierarchical layer (VHL) can be described as the union of all hierarchical interactions of a cell. In such embodiments, the VHLi data is the VHL data that exists in all instances of the cell. The VHLi layer can also be considered to be the intersection of all the hierarchical interactions of a cell. If there is no hierarchical interaction with the instances of a cell, there will not be VHLi data for that cell.

To generate VHLi data for one cell, hierarchical interactions for the instances of the cell are identified. Then, hierarchical interactions for each instance of the cell, that is the cell's parent-child and sibling-sibling interactions, are determined. An interaction is determined to exist when a shape of the parent or a sibling cell falls within the cell boundary. The cell boundary is defined as the rectangular boundary that encloses the geometric shapes from one or more data layers of the cell. In some embodiments, the boundary of a cell is enlarged by adding an ambit area surrounding the cell. Each of the shapes involved in the hierarchical interactions are then transformed into the coordinate space of the cell and subtracted from an area bounded by the cell boundary. The results for each cell instance are then merged and the merged results subtracted from a new area bounded by the cell boundary. In total, the process results in a shape showing interactions that occur in each of the instantiations of the cell in the IC design.

One given embodiment provides an efficient method for generating VHLi data, further defined in the detailed description below. Another embodiment relates to the use of the VHLi layer. Specifically, VHLi shapes give a child cell the knowledge of interactions from both parent and sibling cells. This knowledge is not typically made available within traditional hierarchical processing algorithms without loading the parent or sibling cell into the memory. The VHLi shapes are powerful, as they enable the physical verification software tool to simplify hierarchical interactions, accomplish more cell-level data processing, and generate results in the lower level cells without the need to flatten the data upward from the child cells to the parent cell to resolve the hierarchical interactions. Thus the VHLi shapes improve the quality of the DRC results as well as the overall operational efficiency.

Another benefit of the VHLi layer is that the layer can be shared and reused by multiple commands. As traditional physical verification tools usually spend a large amount of processing time identifying the hierarchical interactions for one command and then repeating the identification for other commands with similar input layers, sharable interaction data can prove extremely helpful in verification. The generation of the VHL and VHLi layer enables multiple commands to share the global hierarchical information encompassed in the VHL and VHLi.

Further Details

FIG. 1 is a flow diagram for virtual hierarchical layer patterning. The flow 100 describes a computer-implemented method for design analysis. The flow 100 can include obtaining a semiconductor design layout 110 including a plurality of layers and a plurality of hierarchical levels. The semiconductor design layout can be in various formats and can have any number of hierarchical levels describing any number of layers of a mask set for an IC. The layers can represent mask layers, fabrication layers, logical layers, design layers, or any other type of layer. The hierarchical levels can include architectural levels, design levels, logical levels, physical levels, or any other type of level. The hierarchies can include small cells which can be combined into larger cells, larger cells that can be combined into sub-modules, sub-modules that can be combined into modules, modules that can be combined into systems, and so on. The semiconductor design layout can be obtained from a library of design layouts stored in a computer-readable format or by any other method. In various embodiments, the layout is obtained by reading one or more computer files from one or more storage media, by being stored in computer memory and retrieved, by using a logical design to generate a physical semiconductor design layout, by receiving design data entered by a user, by receiving wired or wireless communication, or by scanning layout images, among other methods for obtaining the layout.

The flow 100 includes identifying a cell and multiple instances of the cell 120 within a semiconductor design that includes a plurality of hierarchical design levels. The identified cell can be a logical cell, a design cell, a physical cell, a layout cell, or any other type of cell. In some cases, the cell can be a single cell and have one cell instance. In other cases, the cell can be a repeated cell and have multiple instances throughout the semiconductor design. The cell can be included in another parent, or ancestor, cell, and can itself include other child, or dependent, cells. The cell can be identified for any of a variety of purposes including logical verification, design verification, circuit simulation, design rule checking (DRC), design rules for manufacturing (DRM), and so on. The flow 100 can further include translating each cell from the multiple instances onto a unified coordinate system for the cell 122. The translating of the cell instances can enable comparison of the cell instances by supporting rotation, scaling, mirroring, and so on.

The flow 100 includes determining, for each cell instance, interactions between the cell and other structures 130 in the plurality of hierarchical design levels. The interactions can include a variety of interactions with the cell instances, such as interactions between and among the plurality of hierarchical design levels, between and among polygons at various levels within the design hierarchy, or any other interactions. The polygons can include triangles, rectangles, trapezoids, convex polygons, concave polygons, polygons with holes, complex polygons, or any other type of polygon with any number of sides. The determining of interactions can be based on design rules, design rules for manufacturing (DRM), or any other algorithm. The interactions can be determined for a variety of purposes, including circuit analysis, logical analysis, system analysis, system verification, and so on. The determining of interactions can be based on the boundary of the cell. The boundary of the cell can enclose the geometric shapes from at least one data layer of the cell. As mentioned above, the shapes can include any type of polygon. In some embodiments, the boundary of the cell is expanded by an ambit value. The ambit value represents a small ring area outside the original cell boundary. This extended boundary, known as the ambit boundary, can include hierarchical data from other cells in the hierarchy of design layers.

The flow 100 includes subtracting from the boundary of the cell the interactions that were determined 140 from each cell instance. The cell boundary used for subtraction can include a virtual hierarchical level (VHL) boundary of the cell. The VHL can be useful for a variety of design purposes including design simulation, design analysis, design verification, and so on. The interactions that are subtracted can include interactions that occur between the cell and other structures in the hierarchical design levels. The structures in the hierarchical design levels can include triangles, rectangles, trapezoids, convex polygons, concave polygons, polygons with holes, complex polygons, or any other type of polygon with any number of sides. In embodiments, the shapes which result from the subtracting are in the same plane as the cell which was identified. In some embodiments, the determining, merging, and subtracting are used in the generation of a solid VHL cell plane. The solid VHL cell plane can be used for design simulation, design analysis, design verification, or any other purpose.

The flow 100 includes merging results of the subtracting into the boundary of the cell 150. The merging generates a virtual hierarchical level (VHL) for the identified cell. The VHLs which are generated for the instances of the identified cell can vary from one instance to another because of the potential for differing hierarchical interactions across each of the cell instances.

The flow 100 further includes repeating the identifying 120, determining 130, subtracting 140, and merging 150, for a second cell 160, in some embodiments. The repeating for a second cell 160 can result in generating VHLs for the second cell. The repeating of the identifying 120, determining 130, subtracting 140, and merging 150, can be done for any number of additional cells.

The flow 100 includes subtracting results of the merging from the boundary of the cell to define identical interactions 170 across the multiple instances of the cell. As stated above, the VHLs for different instances of the cell can be dissimilar because of the potential for each of the instances of the cell to interact differently within the hierarchy. The further subtracting the merged results of the instances of the cell from the results of the previous subtracting 140 can reveal common shapes among the VHL layers of each the instances of the cell.

The flow 100 includes using data from the subtracting of the results of the merging to generate a virtual hierarchical layer identical (VHLi) layer 180. The VHLi includes identical hierarchical interactions for all placements of the cell. The VHLi can be useful for a variety of design purposes including design simulation, design analysis, design verification, and so on by providing global hierarchical information about the interactions among the instances of the cell and the various hierarchical levels. The data pushed into the VHLi layer can include hierarchical data from parent cells. Cells that are contained in other cells (parent cells, ancestor cells, etc.) can have interactions with the cells which contain them. The interactions between a cell and its parent cell can be included in the VHLi for the cell. The data pushed into the VHLi layer can also include hierarchical data and interactions from sibling cells. A given instance of a cell can have interactions with sibling cells that are contained within the same parent cell. Thus, the VHLi layer can provide global hierarchical information about overlapping data for a cell.

The VHLi with its global hierarchical information can be used to simplify the design requirements for simulation, analysis, verification, or other design objectives for an IC. For example, design verification can include physical verification of a design. Physical verification can require examination of the physical layout of the design, which includes the physical layers of the cell. The physical verification of the cell can include using hierarchical interaction data contained in the VHLi layer. The hierarchical interaction data in the VHLi can include various shapes such as triangles, rectangles, polygons, and complex polygons, which can be common to all the instances of the cell. Use of the VHLi layer can prevent flattening of the semiconductor design data hierarchy. Implementation of the VHLi during design simulation, design verification, design validation, and so on, can reduce computational resource requirements including processing time, data storage, and the like.

For some embodiments, the flow 100 also includes performing a logical operation with the VHLi layer and a cell 190. Any type of logical operation can be performed, depending on the embodiment, including, but not limited to a Boolean NOT operation, a Boolean AND operation, a Boolean OR operation, or a Boolean exclusive OR (XOR) operation, between one or more VHL layers, VHLi layers, shapes, and/or cells. In one example, generating a solid VHL cell plane can include negating an empty cell plane and creating holes within the solid virtual hierarchical level cell plane based on the interactions. In this example, a Boolean NOT operation is used on the solid VHL layer, and then a Boolean XOR operation is used to create holes based on the locations of the shapes in the cell, which represent the interactions between the VHL and the cell.

Various steps in the flow 100 may be changed in order, repeated, omitted, or the like without departing from the disclosed concepts. Various embodiments of the flow 100 may be included in a computer program product embodied in a non-transitory computer readable medium that includes code executable by one or more processors.

Figure 2:
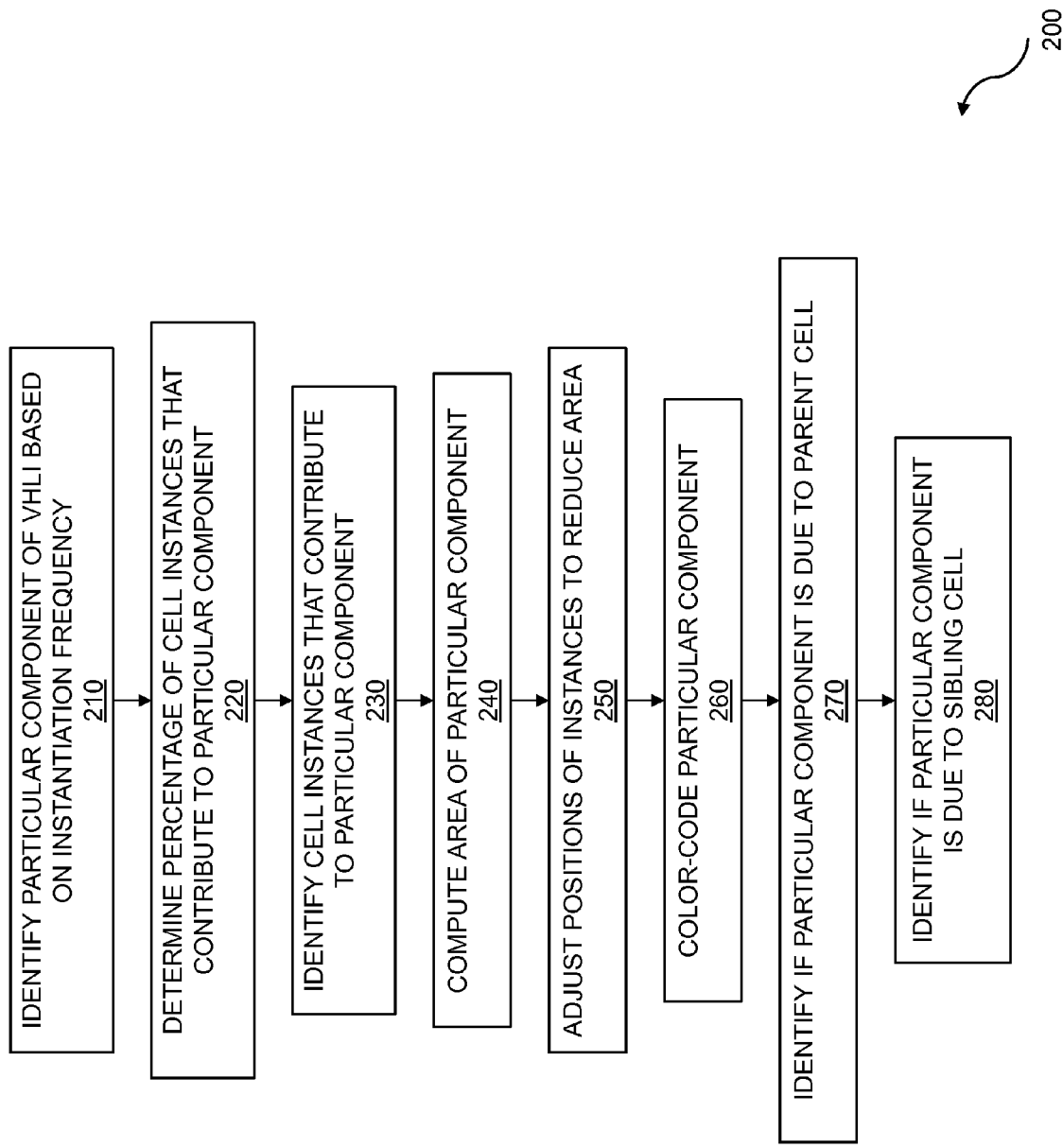
FIG. 2 is a flow diagram for identifying infrequent components.

FIG. 2 is a flow diagram for identifying infrequent components. The flow 200 also describes a computer-implemented method for design analysis. The flow 200 includes identifying a particular component of the VHLi layer based on frequency of instantiation 210. The particular component can also be referred to as an infrequent component. The frequency of instantiation can be determined in different ways in different embodiments, but in at least one embodiment, identifying the particular component includes determining a percentage of cell instances that contribute to the particular component 220. Some embodiments set a threshold to identify a particular component as an infrequent component—if the percentage of cell instances that contribute to the particular component is below a predetermined value the component can be identified as an infrequent component. In some embodiments, particular components can be identified as infrequent components interactively through a user interface.

The flow 200 also includes identifying which cell instances contribute to the particular component 230. The identifying can be done in different ways in different embodiments, such as entries in a design database, textual lists, color coding on a graphical user interface, or any other suitable method of identifying cell instances. In some embodiments, the flow 200 includes computing an area of the particular component 240. The area of the particular component can be used to determine whether or not to provide a warning to a user or to tag the particular component for further analysis. In at least one embodiment, the flow 200 further includes adjusting positions of one or more cell instances to reduce the area of the particular component 250. The flow 200 also includes color coding the particular component 260 in some embodiments. The color coding can be accomplished by actually changing the color of the particular component in a graphical user interface, or by tagging the particular component in the design database with an attribute, such as a color which might never have actual correspondence to the coloration of a particular component in a rendering.

The flow 200 includes identifying if the particular component is due to a shape being present in a parent cell 270 and identifying if the particular component is due to a shape being present in a sibling cell 280. This information can be used to reduce the area of the particular component or eliminate the particular component by adjusting the placement of the cell or the shape in the parent or sibling cell. The identifying can be performed interactively through a graphical user interface, or by providing the identifying information to additional tools in the design process.

Figure 3:
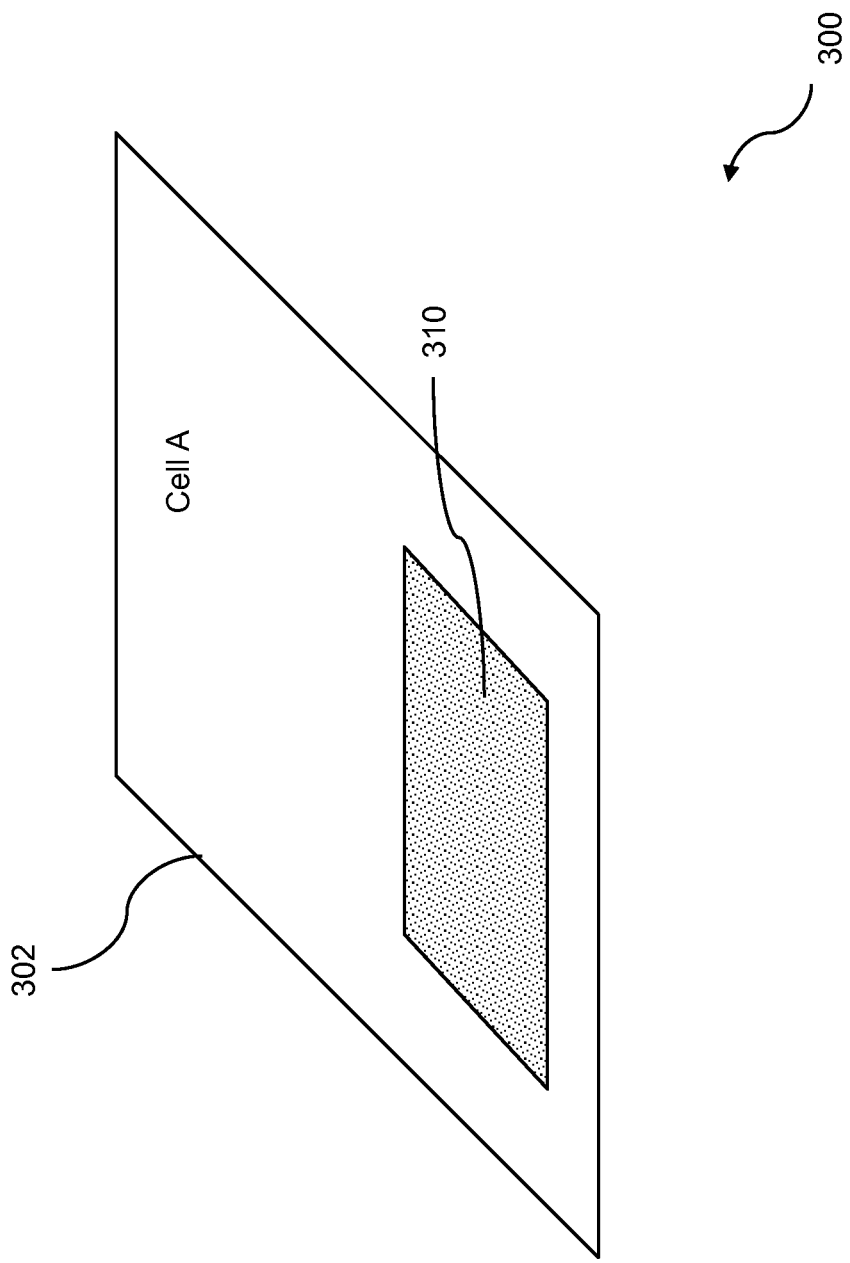
FIG. 3 shows example Cell A cell-level data.
Figure 4:
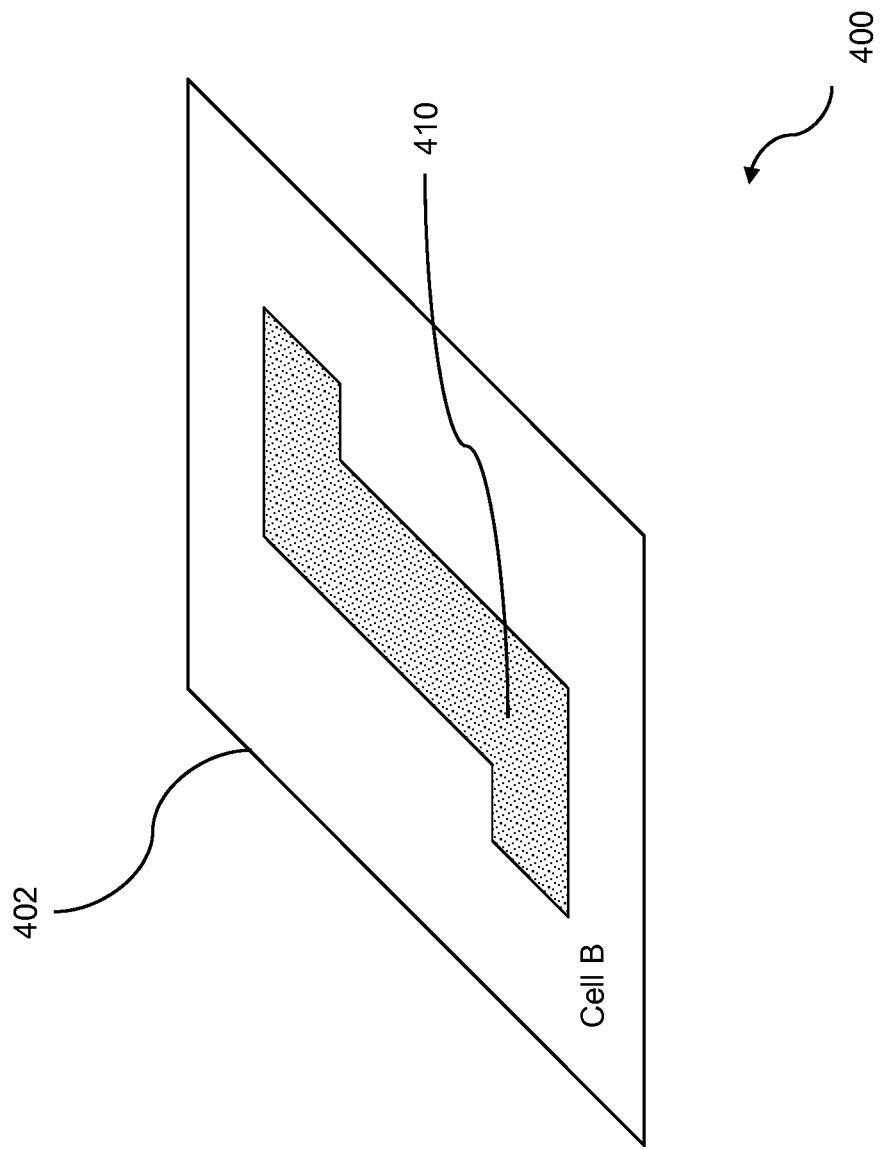
FIG. 4 shows example Cell B cell-level data.

FIG. 3 to FIG. 7 illustrate the concept of VHLi for a particular example. FIG. 3 shows example Cell A 300 cell-level data. Cell A 300 can be included in a design database and can be instantiated any number of times in the design. Cell A 300 has a cell boundary 302 and includes a single polygon shape 310 on the layer being analyzed. FIG. 4 shows example Cell B 400 cell-level data. Cell B 400 can be included in a design database and can be instantiated any number of times in the design. Cell B 400 has a cell boundary 402 and includes a single polygon shape 410 on the layer being analyzed.

Figure 5:
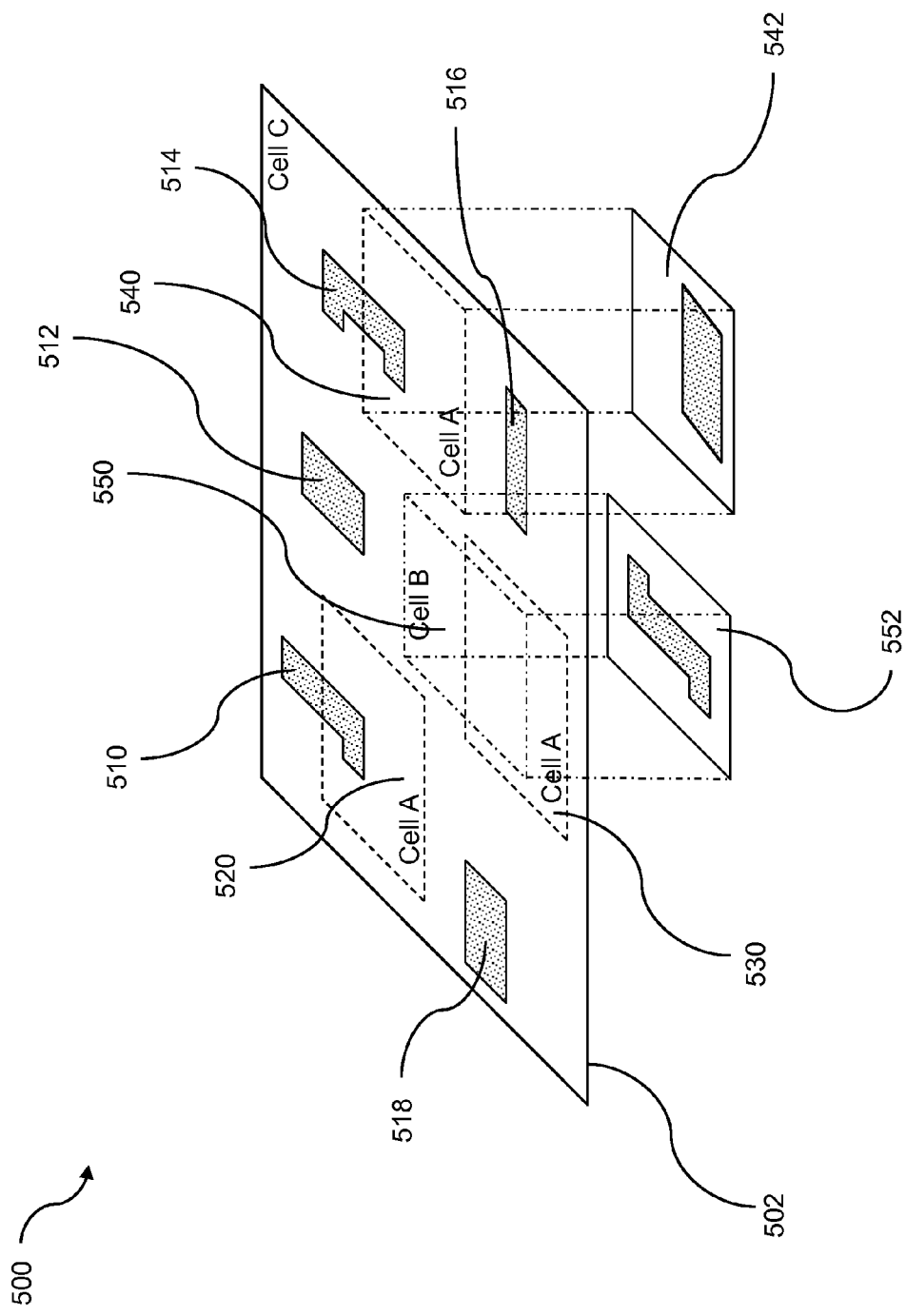
FIG. 5 shows an example hierarchical view: Cell A and Cell B as child cells of Cell C.

FIG. 5 shows an example hierarchical view: Cell A and Cell B as child cells of Cell C. Cell C 500 has a cell boundary 502 and five directly instantiated polygon shapes on the layer being analyzed, a first polygon shape 510, a second polygon shape 512, a third polygon shape 514, a fourth polygon shape 516 and a fifth polygon shape 518. Cell C 500 includes hierarchy in its design as it also includes three instantiations of Cell A, the first instantiation of Cell A 520, the second instantiation of Cell A 530, and the third instantiation of Cell A 540. The detail of the shapes for the third instantiation of Cell A 540 is shown in a detail view 542 but the detail of the other two instantiations of Cell A 520, 530 are left out for clarity. Finally, Cell C 500 includes an instantiation of Cell B 550. The detail of the shapes for the instantiation of Cell B 550 is shown in a detail view 552. In the example shown in FIG. 5, Cell C 500 is a parent to the first instantiation of Cell A 520, the second instantiation of Cell A 530, the third instantiation of Cell A 540, and the instantiation of Cell B 550. Also, the first instantiation of Cell A 520, the second instantiation of Cell A 530, the third instantiation of Cell A 540, and the instantiation of Cell B 550 are all sibling cells to each other. So in at least some embodiments, the boundary of the cell encloses all geometric shapes from at least one data layer of the cell.

The child cells of Cell C 500 in the example shown overlap some of the directly instantiated polygon shapes 510, 512, 514, 516, and 518, as well as other child cells. The first instantiation of Cell A 520 overlaps with a polygon shape 510 and the third instantiation of Cell A 540 overlaps with another polygon shape 514. In addition, the second instantiation of Cell A 530 overlaps with the instantiation of Cell B 550.

Figure 6:
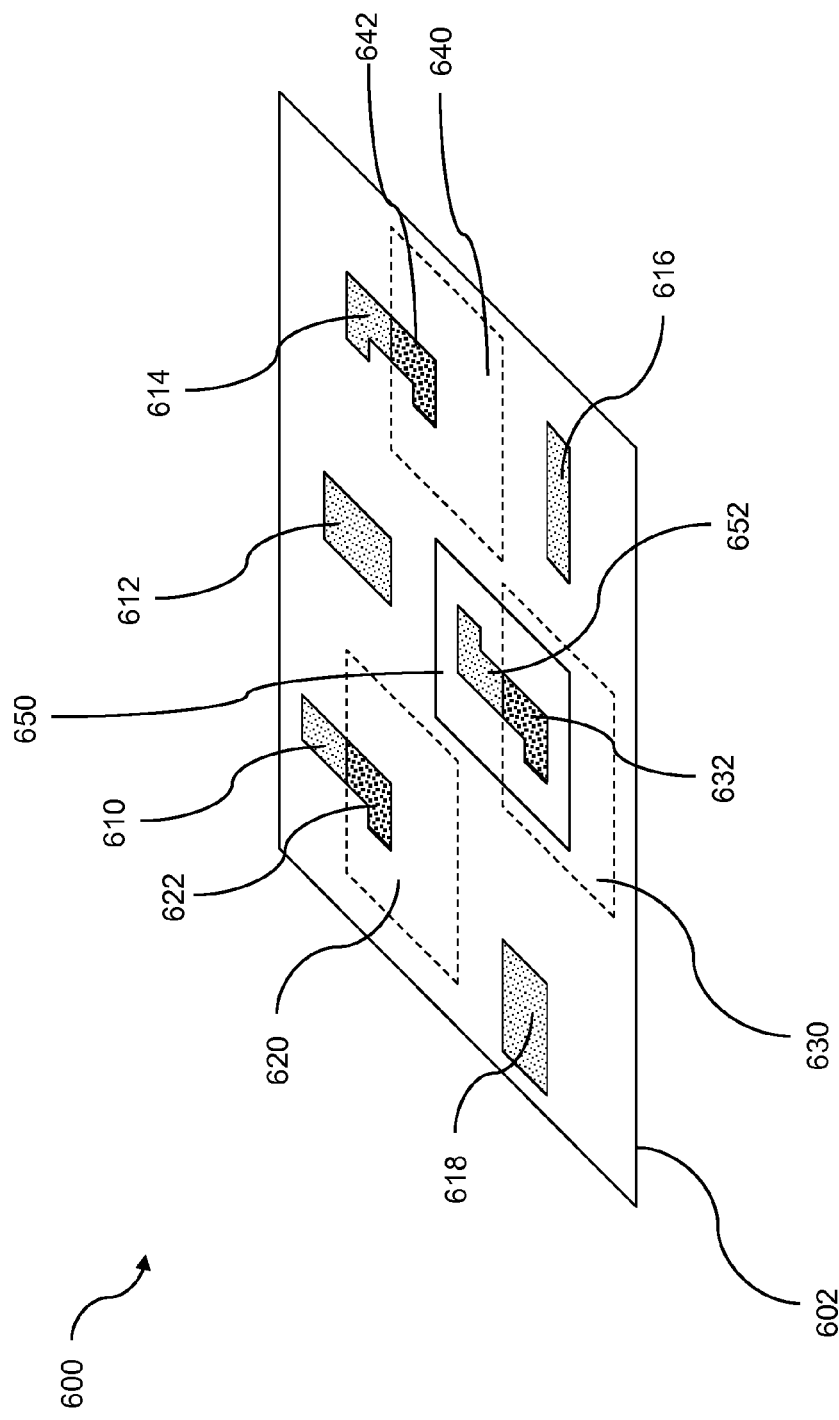
FIG. 6 shows example hierarchical interactions for instances of Cell A.

FIG. 6 shows example hierarchical interactions for instances of Cell A. An instantiation of Cell C 600, similar to that shown in FIG. 5, includes a cell boundary 602, five directly instantiated polygonal shapes 610, 612, 614, 616, and 618, and three instantiations of Cell A 620, 630, and 640, as well as an instantiation of Cell B 650. Several interactions with the three instantiations of Cell A 620, 630, and 640 are shown. The polygonal shape 610 interacts with the first instantiation of Cell A 620 with the subset 622 of the polygon actually overlapping the cell 620. Polygonal shape 614 interacts with the third instantiation of Cell A 640 with the subset 642 of the polygon actually overlapping the cell 640. And the polygonal shape 652 of the instantiation of Cell B 650 overlaps with the second instantiation of Cell A 630, with the subset 632 actually overlapping the cell 630. In the example given here, the interactions with the three instantiations of Cell A 620, 630, and 640 are all the same; therefore, the shape of the three subsets 622, 632, and 642 are the same, overlapping the same area of the three instantiations of Cell A.

Figure 7:
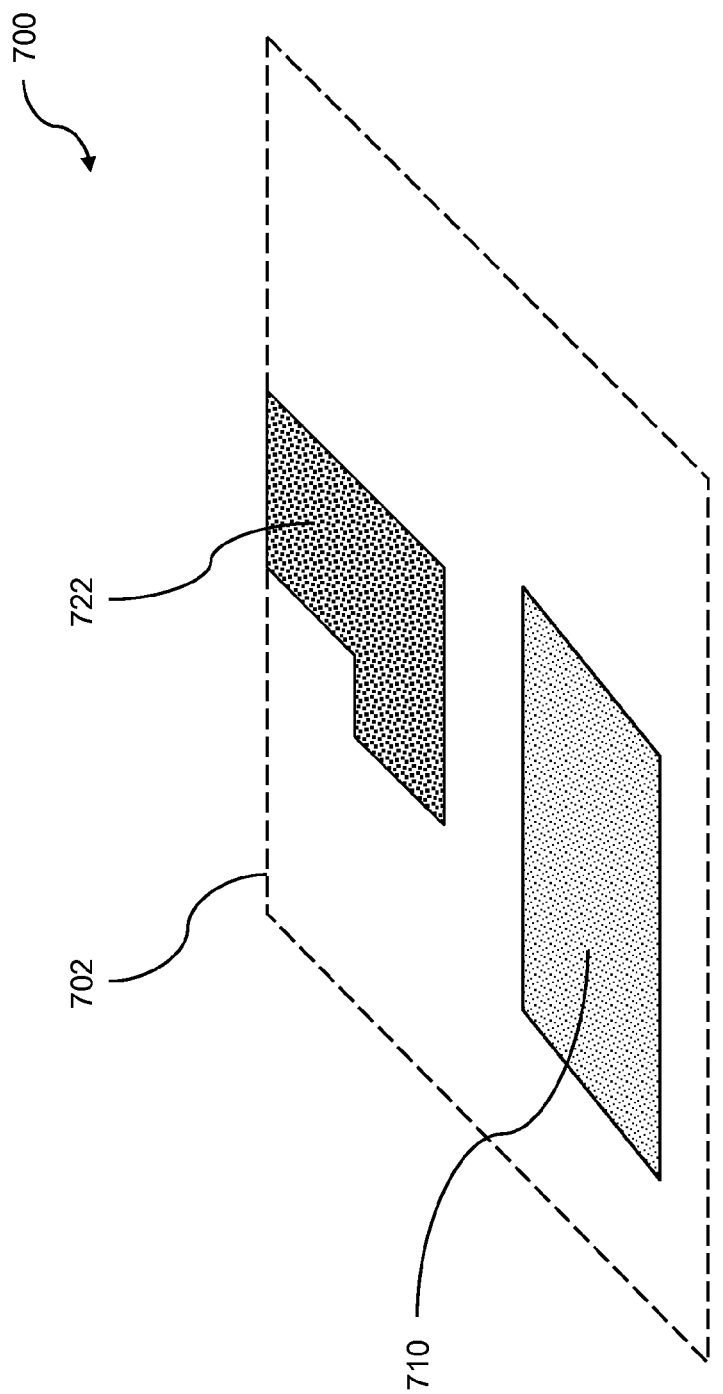
FIG. 7 shows an example VHLi of Cell A.

FIG. 7 shows an example VHLi of Cell A. The graphical representation of the VHLi 700 of Cell A includes a cell boundary 702 and the polygonal shape 710 of Cell A. The VHLi also includes a polygonal shape 722 representing the subset of the overlapping shapes from parent and sibling cells, which all have the same shape in this example as discussed above. So in some embodiments, data pushed into the VHLi layer includes hierarchical data from sibling cells. In some embodiments, data pushed into the VHLi layer includes hierarchical data from parent cells. Because only the interacting data is pushed into the VHLi layer, instead of all other data outside of the cell, the use of the VHLi layer prevents flattening of the semiconductor design. In some embodiments, additional analysis is done on the design by performing physical verification using the VHLi layer.

Figure 8:
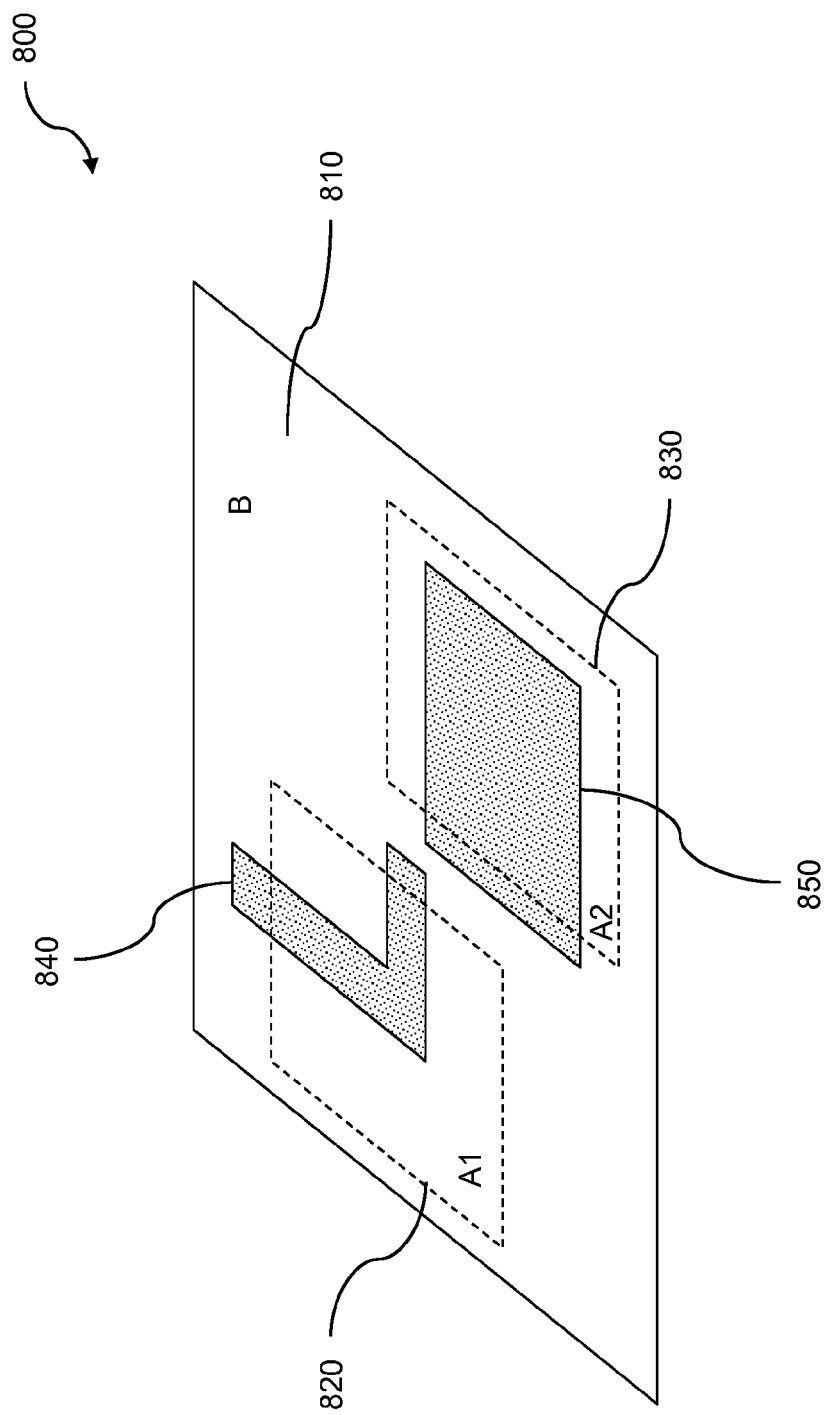
FIG. 8 shows an example hierarchical view: Cell A as a child of Cell B.
Figure 9:
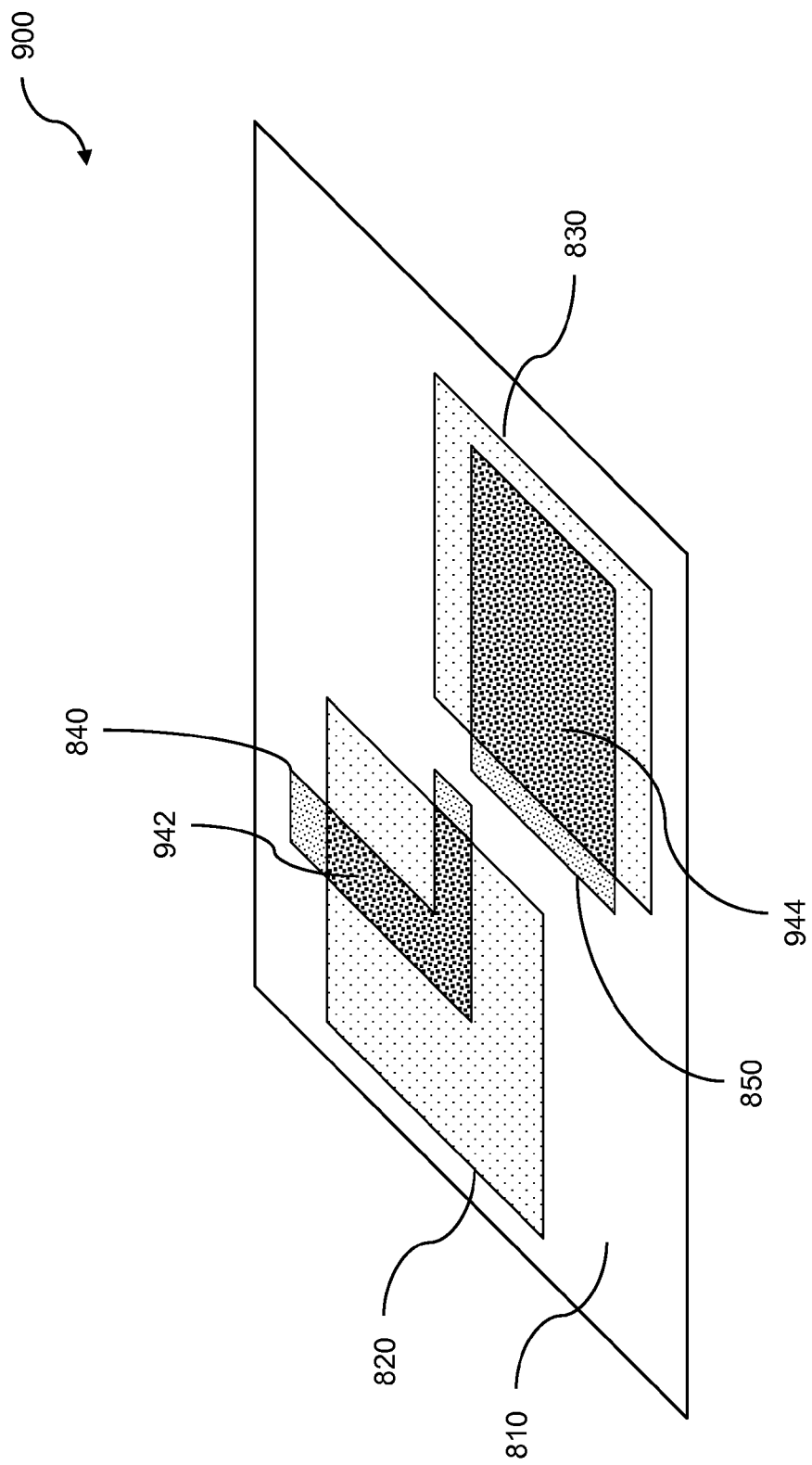
FIG. 9 shows example hierarchical interactions for instances of Cell A.
Figure 10:
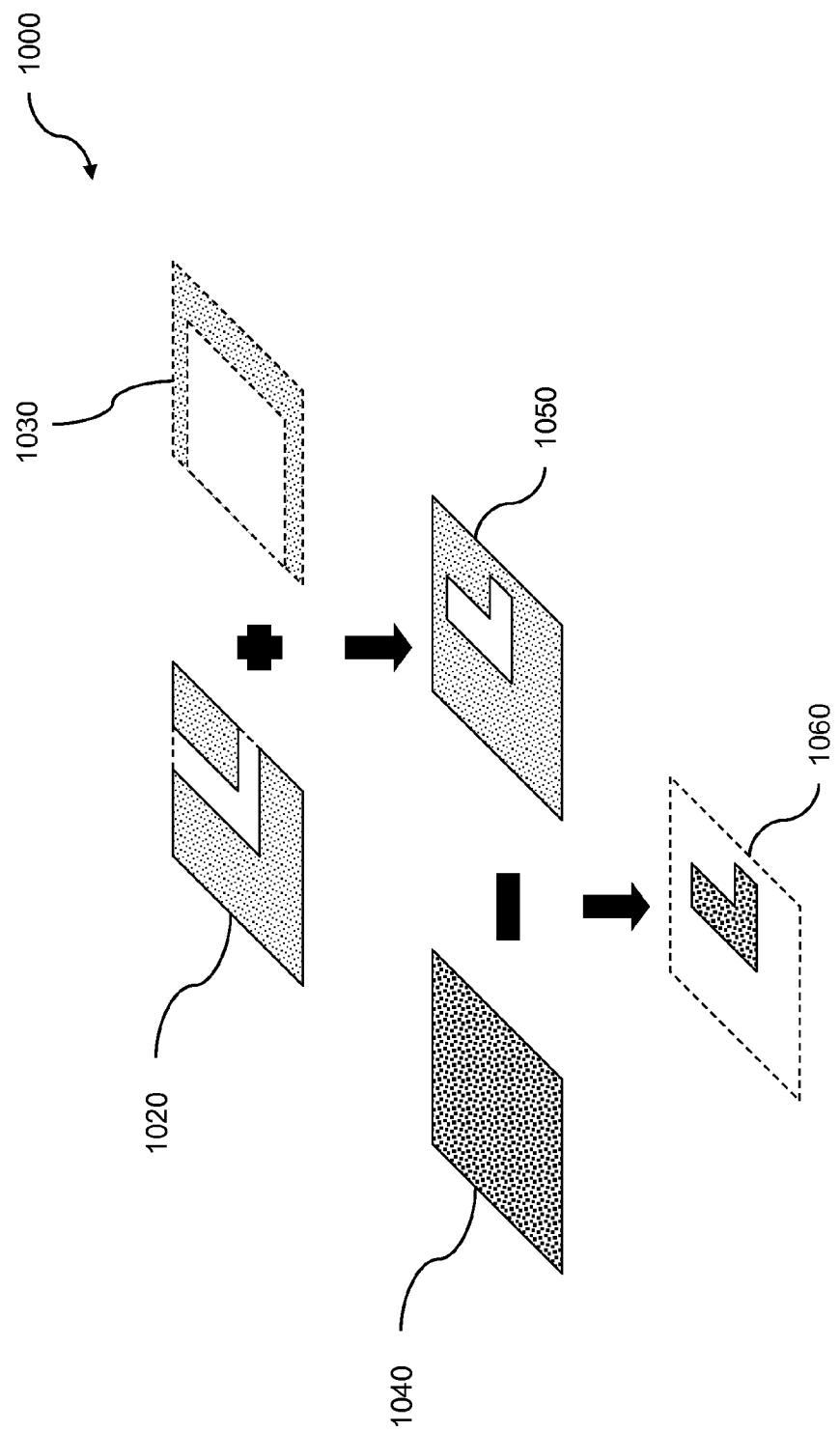
FIG. 10 shows example steps to generate a VHLi.

FIG. 8 to FIG. 10 illustrate an efficient method to identify VHLi data and create the VHLi layer. FIG. 8 shows an example hierarchical view: Cell A as a child of Cell B. The design example 800 includes an instance of Cell B 810 that contains two placements of Cell A, a first instantiation 820 and a second instantiation 830. In addition, the instance of Cell B has a first polygon 840 that partially overlaps the first instantiation of Cell A 820 and a second polygon 850 that partially overlaps the second instantiation of Cell A 830.

FIG. 9 shows example hierarchical interactions for instances of Cell A. The graphical view 900 of Cell B 810 shows the first instantiation of Cell A 820 and the second instantiation of Cell A 830 as well as the first polygon 840 and the second polygon 850. The interaction between the instantiations of Cell A 820 and 830 and the polygons 840 and 850 of Cell B 810 are shown with different fill patterns. The first densely patterned area 942 shows the hierarchical interaction between the first instantiation of Cell A 820 and the first polygon 840, and the second densely patterned area 944 shows the hierarchical interaction between the second instantiation of Cell A 830 and the second polygon 850.

FIG. 10 shows example steps to generate a VHLi. The same method described above and shown in FIG. 8 and FIG. 9 is used in this example. As shown in FIG. 9, each instance of Cell A is located and the cell's hierarchical interactions are found and translated into Cell A's coordinate system. As described above, the first instantiation of Cell A 820 interacts with the first polygon 840 and the second instantiation of Cell A 830 interacts with the second polygon 850. Then the hierarchical interactions are subtracted from the VHL boundary of the cell. The shape 1020 shows the results of subtracting the hierarchical interaction between the first instantiation of Cell A 820 and the first polygon 840 from the VHL boundary of Cell A. The shape 1030 shows the results of subtracting the hierarchical interaction between the second instantiation of Cell A 830 and the second polygon 850 from the VHL boundary of Cell A. Both the shape 1020 and the shape 1030 are drawn in Cell A's coordinate system.

The first cell interaction shape 1020 can be determined by a logical operation between the VHL boundary of the first instantiation of Cell A 820 and the first polygon 830. In at least one embodiment, the logical operation includes a Boolean AND operation between layers and/or a Boolean NOT operation on a layer. In this example, the first cell interaction shape 1020 can be determined by a Boolean AND operation between the VHL boundary of the first instantiation of Cell A 820 and a Boolean NOT of the first polygon 830. The second cell interaction shape 1030 can be determined by a Boolean AND function between the VHL boundary of the second instantiation of Cell A 830 and a Boolean NOT of the second polygon 840. The interaction shapes from the instances of the cell, in this example the first shape 1020 and the second shape 1030, are then merged into a single shape 1050. A Boolean OR function can be used for this operation. Then the results, the shape 1050, are subtracted from a solid plane 1040 bounded by the boundary of Cell A to create the VHLi 1060 for this example. In some embodiments, a Boolean exclusive or (XOR) operation is used to accomplish the subtracting of the merged shape 1050 from the boundary of Cell A.

The VHLi layer can include identical hierarchical interactions for two or more placements of the cell. In at least some embodiments, all placements, or instantiations, of a cell in a design are included in the VHLi layer. Note that if there is no common interaction for the various instantiations of a cell analyzed, the VHLi layer will be null.

For a given cell, the VHLi layer provides global hierarchical information about the overlapping data from the parent and sibling cells for all the instantiations of the cell in a design. Since the VHLi conveys information about identical global hierarchical interactions for the cell, it can allow physical verification algorithms to process the IC design layers using fast cell-level computation and single-pass bottom-up processing (i.e. data is loaded once), reducing data flattening and memory consumption. The VHLi layer can be shared and reused by multiple commands. This sharing represents a powerful tool, as one layer usually feeds into multiple commands and each command no longer needs to duplicate the effort to identify hierarchical interactions.

Figure 11:
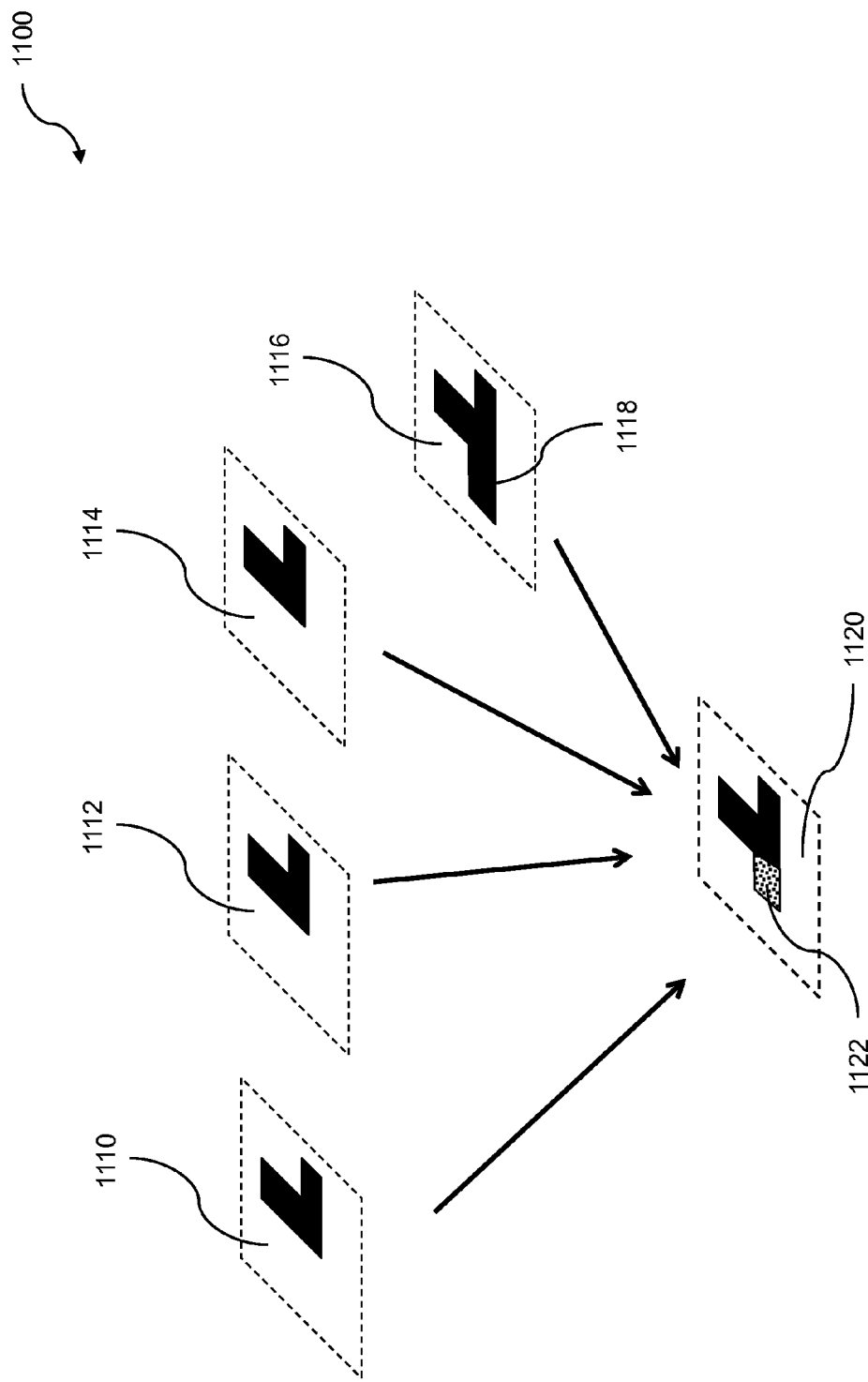
FIG. 11 illustrates the concept of infrequent components.

FIG. 11 illustrates the concept of infrequent components. In the diagram 1100, four example hierarchical interactions 1110, 1112, 1114, and 1116 pertaining to instances of a particular cell are shown. The resulting VHLi, which represents the VHL data that exists in all instances of the cell, is shown in the interaction 1120. The hierarchical interactions (VHL data) 1110, 1112, and 1114 are identical. The hierarchical interaction 1116 is different from the others. Thus it is possible that for a given VHLi, a majority of its patterns are found in many VHL instances, while a portion of the VHLi data is contributed to by a relatively small number of VHL instances. It can therefore be desirable to identify the portions as particular components, which can also be referred to as infrequent components. Infrequent components can be found by identifying a particular component of the VHLi layer based on frequency of instantiation Referring now to the VHLi data 1120, the portion 1122 is caused by the VHL data of the interaction 1118, while the remainder of the VHLi data is caused by all four hierarchical interactions (1110, 1112, 1114, and 1116). In embodiments, if a particular portion of the VHLi data is derived from a relatively small percentage of VHL data instances, then an indication is provided to the user. For example, the particular portion 1122 can be rendered in a different color for a graphic display, and/or a textual message can be displayed on a user interface, to identify it as an infrequent component. An integrated circuit designer can be interested in infrequent components in order to have an opportunity to review the design and see if any cell repositioning is possible to eliminate the infrequent component. In embodiments, the locations of the cells causing the infrequent components are identified and displayed in a graphical and/or textual format. In some embodiments, the criteria for determining when a portion of the VHLi data is deemed as an infrequent component includes determining a percentage of cell instances that contribute to the particular component. For example, if less than five percent of the instances of a particular cell contribute to a particular component of the VHLi data, then the component in question can be deemed as an infrequent component and rendered as such in graphical formats by being color-coded (e.g. rendered in a different color than the rest of the VHLi data) and/or corresponding textual output. In this way, the designer has the opportunity to evaluate and possibly modify the design to reduce the pattern area within the VHLi, which could simplify the design and/or fabrication process.

In some embodiments, the area of the infrequent component is a factor in determining the next actions to take. In embodiments, for example, if the area of the infrequent component is relatively small, then no warning is generated. However, if the area of the infrequent component is relatively large, then a warning can be generated, since there can be significant reduction in the area of the VHLi pattern if the infrequent component can be eliminated or reduced by repositioning one or more cells. In embodiments, the hierarchical verification tools automatically identify cell instances contributing to infrequent components and attempt a positional adjustment to optimize the VHLi data to a minimal area. The size threshold for an infrequent component triggering a warning can be dependent on the technology node size (e.g. 14 nm). In this way, embodiments not only generate a VHLi, but can also perform optimization of the VHLi.

FIG. 12 to FIG. 17 illustrate an example application that can take advantage of the virtual VHLi layer. As mentioned above, a hierarchical geometric layer can be created for the purpose of processing hierarchical DRC techniques and data in an efficient manner. Various hierarchical geometric layers of an IC design can be analyzed to generate a VHL. The VHL can be generated for a given cell from a combination of various geometric shapes including rectangles, trapezoids, and so on, that are present on various hierarchical layers above the cell. Further, the VHL can include information from geometric shapes in non-descendent sibling cells that have interactions with the cell for which a VHL can be determined. The hierarchical information for the cell includes any geometric shape that overlaps any hierarchical placement of the cell and that is not contained by cell. The VHL can then be computed from the hierarchical information, where the hierarchical information is determined by processing all cells in the design hierarchy against the boundary of the current cell.

Figure 12:
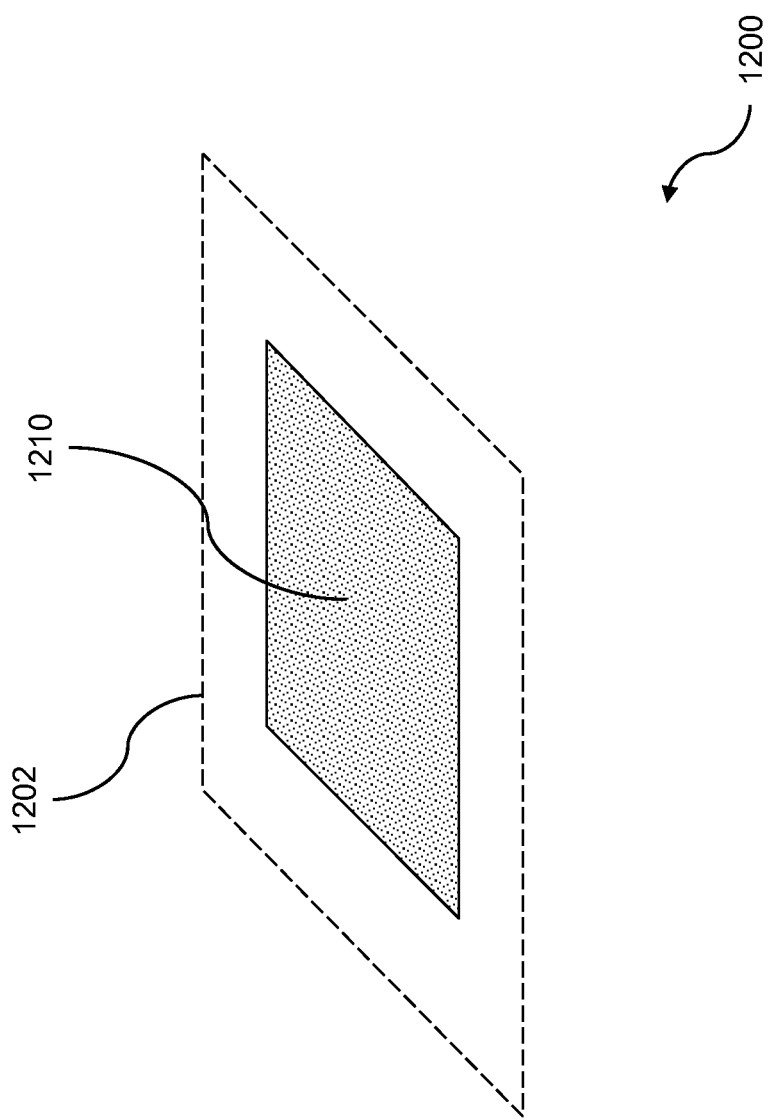
FIG. 12 shows example cell-level data of layer 1 of Cell A.

FIG. 12 shows example cell-level data for a Cell A 1200. Cell A can represent a layout of various types of cells that can appear anywhere in an IC design hierarchy. For example, Cell A can be a combinational logic cell such as an AND gate, a NAND gate, an OR gate, a NOR gate, an XOR gate, an XNOR gate, a NOT gate, and so on. Cell A can be a sequential logic cell such as a latch, a register cell, a flip-flop, etc. Cell A can be another type of cell including a driver, a buffer, a pad, a test cell, etc. Cell A can include interconnect. Cell A can be a complex cell that is formed from one or more simple cells. Cell A 1200 has a cell boundary 1202 that can contain geometric shapes on more or more layers that represent Cell A. The geometric shapes can include rectangles, trapezoids, etc. that form wires, active devices, and so on. Cell A 1200 can include data that represents the geometric shapes including one layer 1 shape

1210. In this particular example there are no shapes on layer 2, layer 3, and so on, while in other examples there can be shapes on one or more of layer 2, layer 3, etc. Determining a VHL for Cell A 1200 can include finding any geometric shape that can overlap any hierarchical placement of Cell A 1200.

Figure 13:
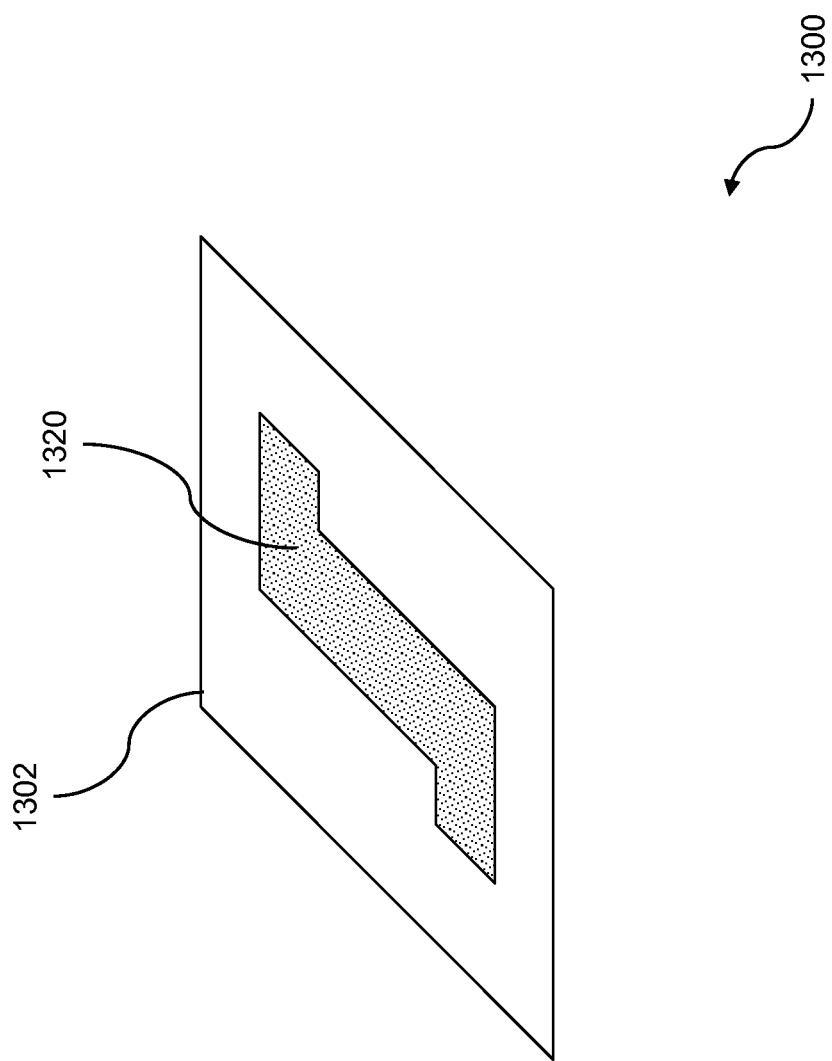
FIG. 13 shows example cell-level data of layer 2 of Cell B.

FIG. 13 shows example cell-level data for a Cell B 1300. Cell B can represent a layout of various cells include combinational cells, sequential sells, special cells, and so on. As for Cell A 1200, Cell B 1300 can appear anywhere in an IC design hierarchy. Cell B has a cell boundary 1302 that delineates Cell B from other cells. The boundary 1302 can contain one or more geometric shapes on one or more layers of the IC design hierarchy. Cell B 1300 can include data that represents a geometric shape 1320 on layer 2. In this particular example, there are no shapes within boundary 1302 of Cell B on layer 1, layer 3, and so on. In other example cells there can be data on layer 1, layer 3 and so on in addition to or instead of data on layer 2. Determining a VHL for Cell B 1300 can include finding any geometric shape or shapes that can overlap any placement of Cell B 1300 anywhere in the ID design hierarchy.

Figure 14:
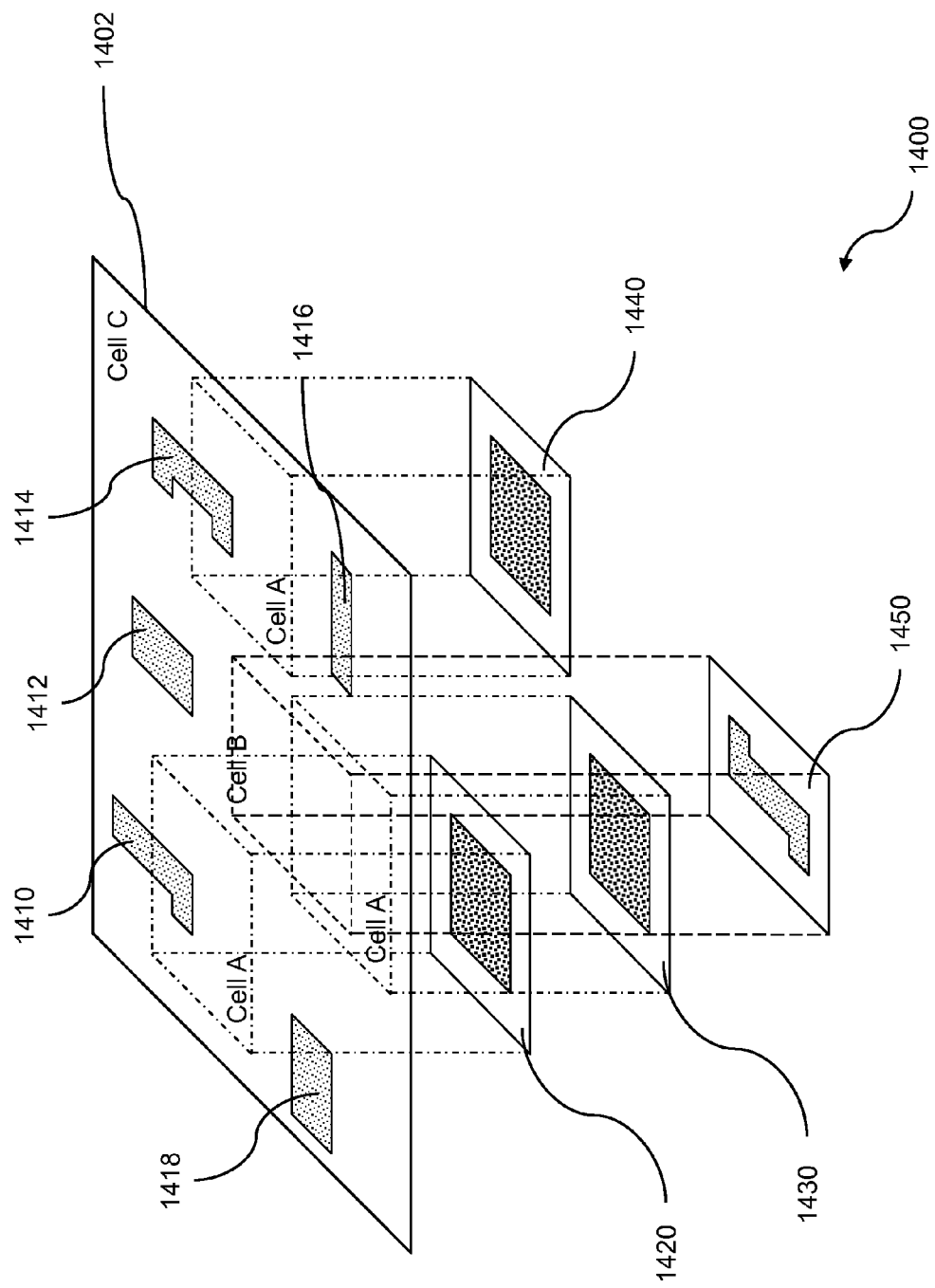
FIG. 14 shows an example hierarchical view: Cell A and Cell B as child cells of Cell C.

FIG. 14 shows an example hierarchical view: Cell A and Cell B as children cells of Cell C 1400. Cell C 1400 has a cell boundary 1402 and five directly instantiated polygon shapes on layer 2: a first polygon shape 1410, a second polygon shape 1412, a third polygon shape 1414, a fourth polygon shape 1416 and a fifth polygon shape 1418. Cell C 1400 includes hierarchy in its design as it also contains three instantiations of Cell A: the first instantiation of Cell A 1420, the second instantiation of Cell A 1430, and the third instantiation of Cell A 1440. Finally, Cell C 1400 includes an instantiation of Cell B 1450. In the example shown in FIG. 14, Cell C is a parent to the first instantiation of Cell A 1420, the second instantiation of Cell A 1430, the third instantiation of Cell A 1440, and the instantiation of Cell B 1450. Also, the first instantiation of Cell A 1420, the second instantiation of Cell A 1430, the third instantiation of Cell A 1440, and the instantiation of Cell B 1450 are all sibling cells to each other. In some embodiments, the boundary of the cell is expanded by an ambit value for analysis. This adjustment allows evaluation of interactions that can occur due to close proximity to a cell to be captured.

Figure 15:
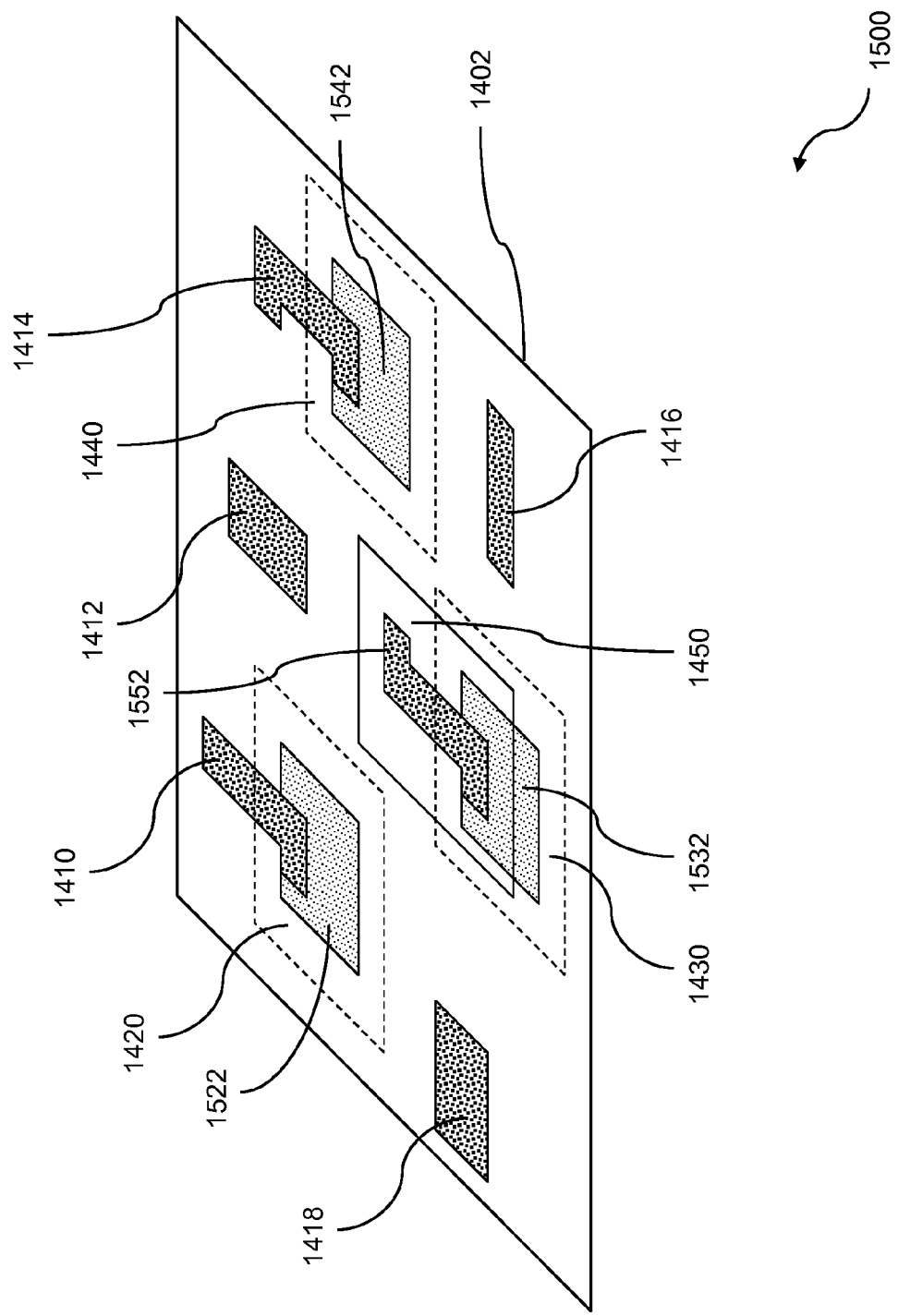
FIG. 15 shows example layer 2 hierarchical interactions for Cell A.

FIG. 15 shows example layer 2 hierarchical interactions for Cell A. The shapes of the child cells are shown on the same plane as the shapes of the parent cell to illustrate the interaction. The shape 1522 on layer 1 of the first instantiation of Cell A 1420 overlaps with the shape 1410 on layer 2. The shape 1542 on layer 1 of the third instantiation of Cell A 1440 overlaps with the shape 1414 on layer 2. And, the shape 1532 on layer 1 of the second instantiation of Cell A 1430 overlaps with the shape 1552 on layer 2 of the instantiation of Cell B 1450. The three instantiations of Cell A, 1420, 1430, and 1440 share an identical layer 2 hierarchical interaction which is used to create a layer 2 VHLi for Cell A.

Figure 16:
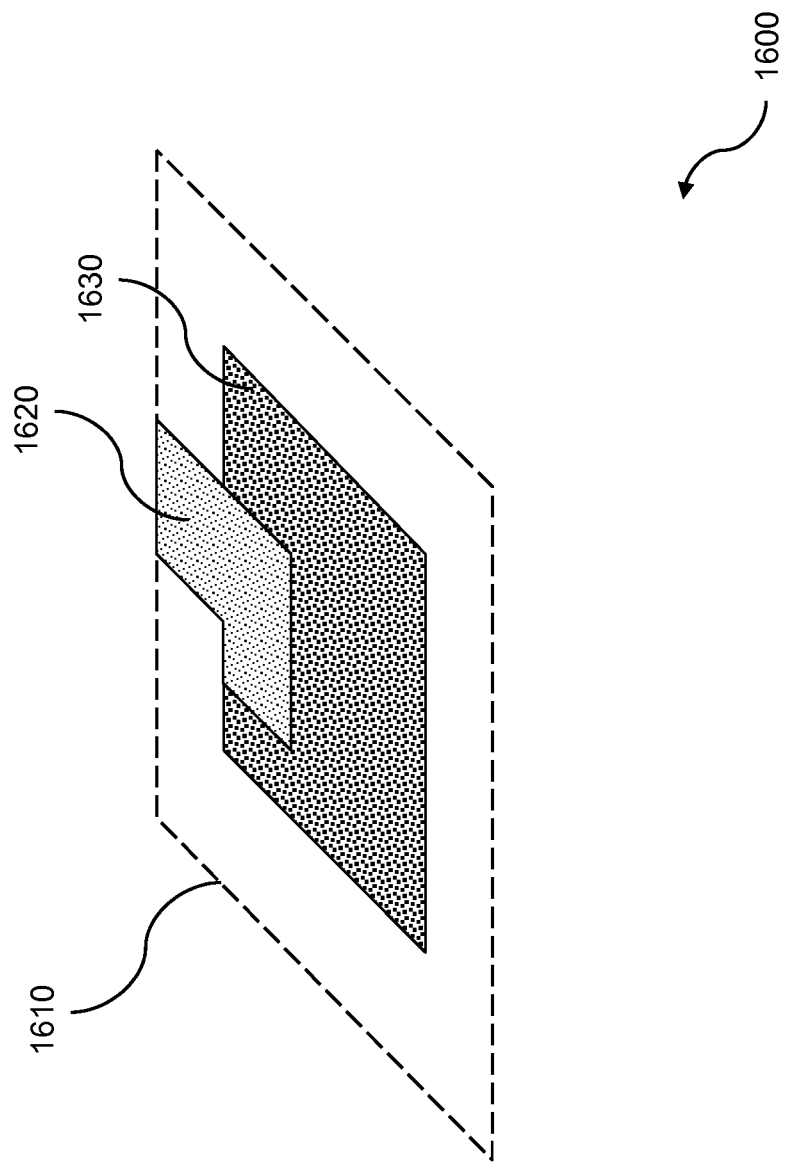
FIG. 16 shows example layer 2 VHLi shapes for Cell A.

FIG. 16 shows example layer 2 VHLi shapes for Cell A. The VHLi data for layer 2 1600 is shown as a lightly shaded polygon 1620. Both the VHLi data for layer 2 1620 and the layer 1 polygon 1630 of Cell A are inside the boundary 1610 of Cell A. Note that the VHLi layer provides global hierarchical information about overlapping data for the cell.

Different layer manipulation operations can use the VHLi layer in different ways. In some embodiments, the VHLi data is treated as the cell's cell-level data. A common usage is similar to the Boolean NOT operation described in the above example; that is, some layer operations only need to generate VHLi data for one input layer. For example, in the Boolean NOT operation described above, in order to keep the design hierarchy of layer 1, VHLi data is only generated for layer 2, not layer 1. Other operations can take advantage of VHLi for both input layers. For example, a Boolean AND operation can use VHLi data from both layers to keep the result hierarchical.

Figure 17:
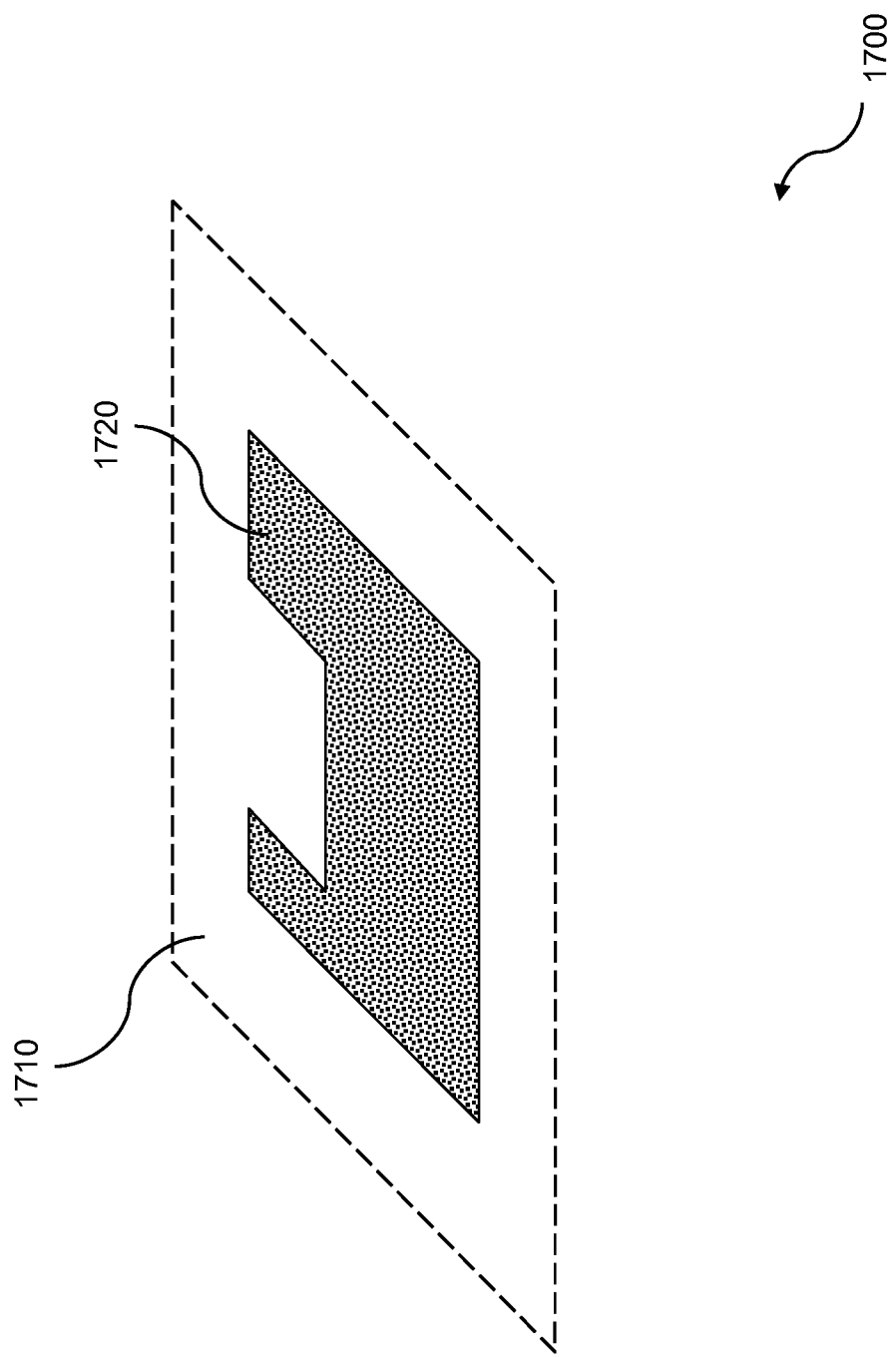
FIG. 17 shows example results for layer 1 Boolean NOT layer 2 for Cell A.

FIG. 17 shows example results for the operation "Layer 1 Boolean NOT Layer 2" for Cell A. The FIG. 1700 shows the results of a Boolean NOT operation performed on the layer 2 VHLi data, combined with a Boolean AND operation on the layer 1 data to subtract the layer 2 VHLi data from the layer 1 data of the cell 1710 to create the shape 1720. This example shows performing a logical operation with the VHLi layer and a cell. The logical operation shown comprises a Boolean NOT operation on a layer and/or a Boolean AND operation between layers.

When a logical operation such as "Layer 1 Boolean NOT Layer 2" (or more generally, "Layer X Boolean NOT Layer X+1") is performed for Cell A using the knowledge of the VHLi data, it does not matter that there is no cell-level layer 2 data in Cell A. It simply shows that there is a layer 2 shape placed on top of all the instances of Cell A. Cell A's layer 2 VHLi shapes can be treated as if they are the cell level layer 2 shape of Cell A.

Figure 18:
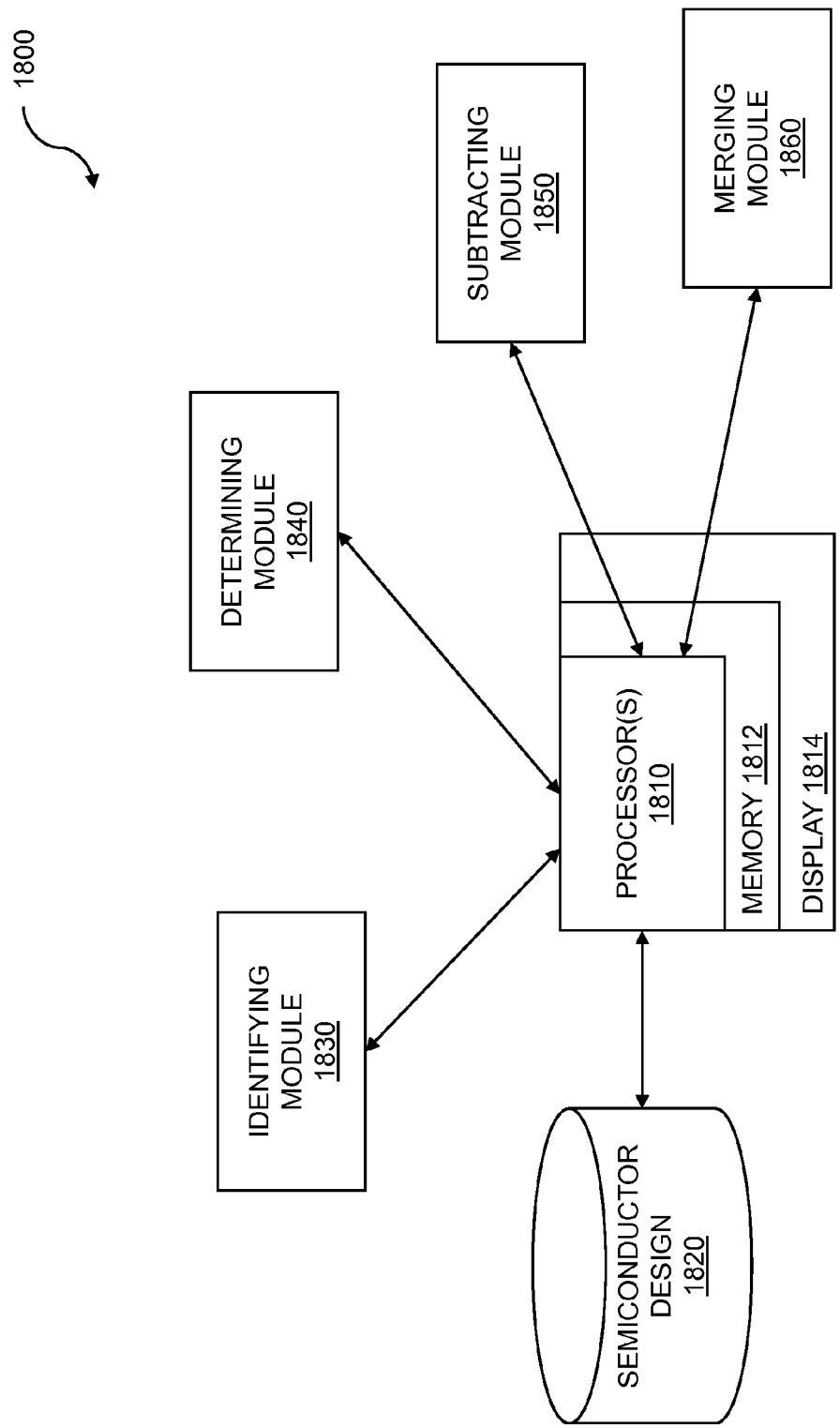
FIG. 18 is a system diagram for design analysis.

FIG. 18 is a system diagram for design analysis. The design analysis can include virtual hierarchical layer patterning. The system 1800 can include one or more processors 1810 which are coupled to a memory 1812. The memory 1812 can be used to temporarily or permanently store computer code and computer instructions, as well as calculated, temporary, partial, intermediate, and permanent computer data. The memory can also be used to store help files, answers to "frequently asked questions" (FAQ), usage manuals, and so on. The data can include any appropriate type or types of data, such as data for one or more semiconductor design layouts, hierarchical representations, or any other type of data. The design data can include layout information, layer information, mask information, optical information, design information, configuration information, test data and instructions, and so on. The data can include other types of data such as, but not limited to, system support information or analysis results. A display 1814 can also be present. The display 1814 can be any of a variety of electronic displays and screens, including, but not limited to, a computer display or screen, a laptop computer screen, a tablet screen, a handheld display, a remote display, a projector, or a television. An embodiment of a computer program running on the one or more processors 1810 is able to perform virtual hierarchical layer patterning.

The system 1800 can include a semiconductor design 1820. The semiconductor design can include a plurality of design levels. The semiconductor design can be stored in any appropriate storage device and medium including a hard disk drive (HDD), a solid-state drive (SSD), or another computer-readable storage medium. The semiconductor design can include descriptions of layers, hierarchies of layers, descriptions of rectangles and polygons, and so on. An identifying module 1830 can be included in the system 1800. The identifying module can be used to identify a cell and multiple instances of the cell within a semiconductor design that includes a plurality of hierarchical design levels. A determining module 1840 can be included in the system 1800. The determining module can be used to determine, for each cell instance, interactions between the cell and other structures in the plurality of hierarchical design levels. The interacting structures can include shapes in one or more levels in a hierarchy of design levels. The shapes can be rectangles, polygons, complex polygons, and so on. A subtracting module 1850 can be included in system 1800. The subtracting module can be used to subtract, for each cell instance, from a boundary of the cell, the interactions that were determined. The subtracting module can subtract in order to define identical interactions which were identified across multiple instances of the cell. A merging module 1860 can be included in system 1800. The merging module can be used to merge results of the subtracting into the boundary of the cell. The results of the merging, based on the subtracting results, can be used to generate a virtual hierarchical layer identical (VHLi) layer.

The system 1800 can include a computer program product for design analysis. The computer program product can be embodied in a non-transitory computer readable medium and can comprise code for identifying a cell and multiple instances of the cell within a semiconductor design that includes a plurality of hierarchical design levels; code for determining, for each cell instance, interactions between the cell and other structures in the hierarchical design levels; code for subtracting, for each cell instance, from the boundary of the cell, the interactions that were determined; code for merging results of the subtracting into the boundary of the cell; and code for subtracting results of the merging from the boundary of the cell to define identical interactions across the multiple instances.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A computer-implemented method for design analysis comprising:
    identifying a cell and multiple instances of the cell within a semiconductor design that includes a plurality of hierarchical design levels;
    determining, using one or more processors, for each cell instance, interactions between the cell and other structures in the plurality of hierarchical design levels;
    subtracting, using one or more processors, for each cell instance, from a boundary of the cell, the interactions that were determined;
    merging, using one or more processors, results of the subtracting into the boundary of the cell;
    subtracting, using one or more processors, results of the merging from the boundary of the cell to define identical interactions across the multiple instances;
    generating, using one or more processors, a virtual hierarchical layer identical (VHLi) layer using data from the subtracting results of the merging;
    repeating the identifying, the determining, the subtracting the interactions, the merging, the subtracting results of the merging, and the generating for a second cell; and
    producing, using one or more processors, a final design layout for fabrication wherein the final design layout is based on said generated VHLi layer.

2. The method of claim 1 wherein use of the VHLi layer prevents flattening of the semiconductor design.

3. The method of claim 1 wherein the VHLi layer provides global hierarchical information about overlapping data for the cell.

4. The method of claim 1 wherein the VHLi layer includes identical hierarchical interactions for two or more placements of the cell.

5. The method of claim 1 wherein data pushed into the VHLi layer includes hierarchical data from sibling cells.

6. The method of claim 1 further comprising performing physical verification using the VHLi layer.

7. The method of claim 1 further comprising performing a logical operation with the VHLi layer and a cell.

8. The method of claim 7, wherein the logical operation comprises a Boolean NOT operation on a layer.

9. The method of claim 7, wherein the logical operation comprises a Boolean AND operation between layers.

10. The method of claim 1 further comprising identifying a particular component of the VHLi layer based on frequency of instantiation.

11. The method of claim 10, wherein identifying the particular component comprises determining a percentage of cell instances that contribute to the particular component.

12. The method of claim 11, further comprising identifying which cell instances contribute to the particular component.

13. The method of claim 12, further comprising computing an area of the particular component.

14. The method of claim 13, further comprising adjusting positions of one or more cell instances to reduce the area of the particular component.

15. The method of claim 13, further comprising identifying if the particular component is due to a shape being present in a parent cell.

16. The method of claim 13, further comprising identifying if the particular component is due to a shape being present a sibling cell.

17. The method of claim 1 further comprising translating each cell from the multiple instances onto a unified coordinate system for the cell.

18. The method of claim 1 wherein data pushed into the VHLi layer includes hierarchical data from parent cells.

19. The method of claim 1 wherein the boundary of the cell encloses all geometric shapes from at least one data layer of the cell.

20. The method of claim 1 wherein the boundary of the cell is expanded by an ambit value.

21. The method of claim 1 wherein the determining, merging, and subtracting are used in generation of a solid virtual hierarchical level cell plane.

22. The method of claim 1 wherein a solid virtual hierarchical level cell plane includes negating an empty cell plane and creating holes within the solid virtual hierarchical level cell plane based on the interactions.

23. A computer system for design analysis comprising:
    a memory which stores instructions;
    one or more processors coupled to the memory wherein the one or more processors are configured to:
        identify a cell and multiple instances of the cell within a semiconductor design that includes a plurality of hierarchical design levels;
        determine, for each cell instance, interactions between the cell and other structures in the plurality of hierarchical design levels;
        subtract, for each cell instance, from a boundary of the cell, the interactions that were determined;
        merge results of the subtracting into the boundary of the cell;
        subtract results of the merging from the boundary of the cell to define identical interactions across the multiple instances;
        generate a virtual hierarchical layer identical (VHLi) layer using data from the subtracting results of the merging;
        repeat the identifying, the determining, the subtracting the interactions, the merging, the subtracting results of the merging, and the generating for a second cell; and
        produce a final design layout for fabrication wherein the final design layout is based on said generated VHLi layer.

24. The system of claim 23 further comprising using data from the subtracting results of the merging to generate a virtual hierarchical layer identical (VHLi) layer.

25. The system of claim 24 wherein use of the VHLi layer prevents flattening of the semiconductor design.

26. The system of claim 24 wherein the VHLi layer provides global hierarchical information about overlapping data for the cell.

27. A computer program product embodied in a non-transitory computer readable medium, which when executed by a processor, causes the processor to perform design analysis, the computer program product comprising instructions that when executed cause the processor to:
- identify a cell and multiple instances of the cell within a semiconductor design that includes a plurality of hierarchical design levels;
- determine, for each cell instance, interactions between the cell and other structures in the plurality of hierarchical design levels;
- subtract, for each cell instance, from a boundary of the cell, the interactions that were determined;
- merge results of the subtracting into the boundary of the cell;
- subtract results of the merging from the boundary of the cell to define identical interactions across the multiple instances;
- generate a virtual hierarchical layer identical (VHLi) layer using data from the subtracting results of the merging;
- repeat the identifying, the determining, the subtracting the interactions, the merging, the subtracting results of the merging, and the generating for a second cell; and
- produce a final design layout for fabrication wherein the final design layout is based on said generated VHLi layer.

28. The computer program product of claim 27 that further causes the processor to use data from the subtracting results of the merging to generate a virtual hierarchical layer identical (VHLi) layer.

29. The computer program product of claim 28 wherein use of the VHLi layer prevents flattening of the semiconductor design.

30. The computer program product of claim 28 wherein the VHLi layer provides global hierarchical information about overlapping data for the cell.

* * * * *